United States Patent
Ryan-Anderson et al.

(10) Patent No.: US 11,934,920 B2
(45) Date of Patent: Mar. 19, 2024

(54) QUANTUM SYSTEM CONTROLLER CONFIGURED FOR QUANTUM ERROR CORRECTION

(71) Applicant: Quantinuum LLC, Broomfield, CO (US)

(72) Inventors: Ciaran Ryan-Anderson, Broomfield, CO (US); Dominic Lucchetti, Louisville, CO (US); Gerald Chambers, Longmont, CO (US); Jason Formo, Brooklyn Park, MN (US); Thomas Skripka, Arvada, CO (US)

(73) Assignee: Quantinuum LLC, Broomfield, CO (US)

( * ) Notice: Subject to any disclaimer, the term of this patent is extended or adjusted under 35 U.S.C. 154(b) by 28 days.

(21) Appl. No.: 17/816,807

(22) Filed: Aug. 2, 2022

(65) Prior Publication Data
US 2023/0054273 A1    Feb. 23, 2023

Related U.S. Application Data

(60) Provisional application No. 63/235,022, filed on Aug. 19, 2021.

(51) Int. Cl.
  *G06N 10/70*    (2022.01)
(52) U.S. Cl.
  CPC .................... *G06N 10/70* (2022.01)
(58) Field of Classification Search
  CPC .............. G06N 10/70; G06N 10/40
  See application file for complete search history.

(56) References Cited

U.S. PATENT DOCUMENTS 10,282,675 B2    5/2019  Bloom et al.
10,922,166 B2 *  2/2021  Hogaboam ............ G06N 10/00
                          (Continued)

FOREIGN PATENT DOCUMENTS

CN    112734043 A    4/2021
CN    113098624 A    7/2021
                     (Continued)

OTHER PUBLICATIONS

D. W. Berry, A. M. Childs and R. Kothari, "Hamiltonian Simulation with Nearly Optimal Dependence on all Parameters," 2015 IEEE 56th Annual Symposium on Foundations of Computer Science, Berkeley, CA, USA, 2015, pp. 792-809, (Year: 2015).*
(Continued)

*Primary Examiner* — Cynthia Britt
(74) *Attorney, Agent, or Firm* — Alston & Bird LLP

(57) ABSTRACT

A quantum system controller configured to perform (near) real-time quantum error correction is provided. The controller comprises a processing device comprising at least one first processing element; a time-indexed command (TIC) sequencer comprising at least one second processing element; and a plurality of driver controller elements configured to control the operation of respective components and associated with respective buffers and processing elements. The processing device is configured to generate commands and the TIC sequencer is configured to cause the time-indexed execution of the commands by the appropriate driver controller elements. The controlling of real-time operations of the quantum computer by the TIC sequencer enables the processing device to generate commands based on conditionals evaluated based on input data indicating quantum errors that are likely present in a quantum calculation being performed by the quantum computer such that commands addressing the quantum errors are generated and executed in (near) real-time.

20 Claims, 12 Drawing Sheets

(56) References Cited

U.S. PATENT DOCUMENTS

| | | | |
|---|---|---|---|
| 10,951,680 | B2 | 3/2021 | Brueck et al. |
| 2018/0260245 | A1 | 9/2018 | Smith |
| 2019/0042973 | A1 | 2/2019 | Zou et al. |
| 2019/0318053 | A1* | 10/2019 | Low ................. G06N 10/20 |
| 2020/0057957 | A1* | 2/2020 | Johnson ............ G06N 10/60 |
| 2021/0067176 | A1 | 3/2021 | Leipold et al. |
| 2021/0152189 | A1* | 5/2021 | Murali .............. G06N 10/70 |
| 2022/0398483 | A1* | 12/2022 | Chernoguzov ...... G06N 10/20 |
| 2022/0405629 | A1* | 12/2022 | Ella .................. G06N 10/70 |
| 2023/0054273 | A1* | 2/2023 | Ryan-Anderson ... G06N 10/40 |

FOREIGN PATENT DOCUMENTS

| | | |
|---|---|---|
| JP | 2014-241484 A | 12/2014 |
| JP | 2019-513249 A | 5/2019 |
| TW | 202121267 A | 6/2021 |

OTHER PUBLICATIONS

Bisio, Alessandro and Dall'Amo, Michele and Perinotti, Paolo "Quantum conditional operations" American Physical Society, Phys. Rev. A vol. 94 issue Aug. 2, 2016 (Year: 2016).*

English translation of JP Decision to Grant dated Sep. 19, 2023 for JP Application No. 2022130756, 3 page(s).

English Translation of TW Office Action, including Search Report, dated Aug. 31, 2023 for TW Application No. 111131270, 8 page(s).

European search report dated Jan. 23, 2023 for EP Application No. 22191037.

JP Decision to Grant dated Sep. 19, 2023 for JP Application No. 2022130756, 3 page(s).

Lin, C., et al., "Pieceable fault-tolerant conversion between Steane and Reed-Muller quantum codes with neural network decoders", arxiv.org, May 15, 2021, XP081963922.

Ryan-Anderson, C., et al., "Realization of real-time fault-tolerant quantum error correction", Jul. 16, 2021, retrieved from the Internet at https://arxiv.org/pdf/2107.07505.pdf on Sep. 12, 2023, 22 pages.

Ryan-Anderson, C., et al., "Realization of real-time fault-tolerant quantum error correction", Phys. Rev. X 11, Dec. 23, 2021, pp. 041058-041058-29.

Tannu, S. S., et al., "Taming the Instruction Bandwidth of Quantum Computers via Hardware-Managed Error Correction", Proceedings of the 50th Annual IEEE/ACM International Symposium on Microarchitecture, Oct. 2017, pp. 679-691.

TW Office Action, including Search Report, dated Aug. 31, 2023 for TW Application No. 111131270, 8 page(s).

* cited by examiner

QUANTUM SYSTEM CONTROLLER CONFIGURED FOR QUANTUM ERROR CORRECTION

CROSS-REFERENCE TO RELATED APPLICATIONS

This application claims priority to U.S. Application No. 63/235,022, filed Aug. 19, 2021, the content of which is incorporated herein by reference in its entirety.

TECHNICAL FIELD

Various embodiments relate to a quantum system controller for a quantum computer and methods relating thereto that enable the quantum system controller to perform quantum error correction. For example, some example embodiments relate to a quantum system controller for a quantum computer configured to perform quantum error correction and methods relating thereto.

BACKGROUND

Large-scale quantum computers are expected to solve problems that are currently intractable with today's technology, such as in the fields of chemistry, material science, and biology. Solving such problems will entail computations employing quantum algorithms implemented using deep quantum circuits. Obtaining the necessary levels of accuracy for these deep circuits requires high levels of reliability for the quantum operations. To achieve such reliability, quantum error correction (QEC) will be employed during computations to suppress noise to required levels. Implementing such computations that utilize QEC will require control systems configured to react to errors experienced by the quantum processor within the coherence time of the qubits. Through applied effort, ingenuity, and innovation many deficiencies of prior quantum computer quantum system controllers and the configuration of quantum computer quantum system controllers to perform QEC have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for performing quantum error correction. For example, various embodiments provide methods, systems, apparatuses, computer program products, and/or the like for determining quantum errors that are and/or are likely present in computations performed using a quantum processor and to address and/or correct the determined quantum errors. For example, various embodiments provide a quantum system controller for a quantum computer that is configured for performing quantum error correction. For example, various embodiments provide methods for performing and/or enabling the performance of quantum error correction by a quantum system controller of a quantum computer.

In various embodiments, the quantum system controller of the quantum computer comprises a classical and/or semiconductor-based processing device configured to generate a first set of commands. The time-indexed execution of the first set of commands causes the quantum processor of the quantum computer to perform a first portion of a quantum circuit. In various embodiments, the processing device is configured to receive and process input data corresponding to and/or indicating the quantum state(s) of one or more physical and/or logical qubits of the quantum processor of the quantum computer. As used herein a logical qubit comprises a plurality of data qubits that are acted upon by the same type of gates at approximately the same time. For example, each data qubit of a logical qubit are evolved in the same manner through a quantum circuit.

In various embodiments, the processing device is configured to receive and process the input data and generate a second set of commands such that at least a portion of the second set of commands is executed by the quantum system controller within a coherence time for the qubit with respect to when the input data was collected. For example, the time-ordered execution of the second set of commands causes a second portion of the quantum circuit to be performed. In some instances, the second set of commands comprises commands that, when executed by the quantum system controller, causes one or more corrections and/or modifications of gates to be applied to one or more data qubits of the quantum processor. For example, applying a correction to a qubit of the quantum processor may include rotating a qubit (e.g., rotating the Bloch sphere representation of the qubit), modifying the phase of a quantum state of the qubit, and/or the like. In various embodiments, modification of a gate to be applied to a data qubit may include rotating the gate within the reference frame of the qubit, and/or the like. For example, a correction or a modification of a gate includes rotating the gate itself or a physical qubit (e.g., a Bloch sphere representation of the physical qubit) around an axis determined by a decoding algorithm configured to process the extracted syndrome, in an example embodiment. For example, the rotation is a pi rotation (e.g., 180 degrees) and may be applied to multiple (e.g., two or more) physical qubits. The correction(s) and modification(s) of the gate(s) are configured to correct one or more quantum errors experienced and/or likely experienced by the data qubit being acted upon. In an example embodiment, at least some of the quantum error correction is performed via software corrections applied to individual qubit registers stored by the quantum system controller.

According to a first aspect of the present disclosure, a method for operating a quantum system controller that enables the quantum system controller to perform real-time, near real-time, and/or in-situ quantum error correction. In an example embodiment, the method comprises generating, by a processing device of a quantum system controller of a quantum computer, a first set of commands configured to cause a quantum processor of the quantum computer to perform a first portion of a quantum circuit using one or more logical qubits of the quantum processor. Each logical qubit of the one or more logical qubits comprises one or more data qubits. The method further comprises causing, by the processing device, the first set of commands to be provided to a time-indexed command sequencer of the quantum computer for time sequencing and time-indexed execution. Time-indexed execution of the first set of commands causes one or more elements of the quantum computer to perform the first portion of the quantum circuit using the one or more logical qubits. The method further comprises determining, by the processing device, that input data is required prior to generation of a second set of commands configured to cause the quantum processor to perform a second portion of the quantum circuit using the one or more logical qubits of the quantum processor. Generating the input data comprises reading one or more ancilla qubits of the quantum processor and the input data corresponds to quantum states of at least one of the one or more data qubits after performance of a respective action. The method further comprises, responsive to determining that the input data is required prior to the generation of the second set of commands, accessing, by the processing device, the input data. The method further comprises processing, by the processing device, the input data, generating the second set of commands based on a result of processing the input data, and causing the second set of commands to be provided to the TIC sequencer for time-indexed execution of the second set of commands within the coherence time of the one or more data qubits. The coherence time is with respect to the respective action.

In an example embodiment, the second set of commands comprises at least one quantum error correction command.

In an example embodiment, execution of the at least one quantum error correction command by an appropriate processing element causes a software-based quantum error correction to be performed.

In an example embodiment, performing the software-based quantum error correction comprises updating a register stored in a memory of the quantum system controller and corresponding to a particular data qubit or a particular logical qubit of the quantum processor to track quantum errors accumulated by the particular data qubit or the particular logical qubit.

In an example embodiment, execution of at least one quantum error correction command by an appropriate processing element causes a correction to be actively or physical performed on a particular data qubit or a particular logical qubit.

In an example embodiment, the correction is selected or determined based on a cumulative error of the particular data qubit or the particular logical qubit as indicated by a register stored in a memory of the quantum system controller and corresponding to the particular data qubit or the particular logical qubit.

In an example embodiment, a register stored in a memory of the quantum system controller and corresponding to the particular data qubit or the particular logical qubit is updated based on the performance of the correction.

In an example embodiment, execution of at least one quantum error correction command by an appropriate processing element causes a gate to be applied to at least a particular data qubit or a particular logical qubit to be modified based at least in part a cumulative error indicated by a register stored in the memory of the quantum system controller and corresponding to the particular data qubit of the particular logical qubit.

In an example embodiment, the register is updated based on the gate being applied to the particular data qubit or the particular logical qubit.

In an example embodiment, accessing the input data comprises determining whether the input data has been loaded by a control processing application being executed by the processing device; responsive to determining that the input data has been loaded by the control processing application, beginning analyzing the input data; responsive to determining that the input data has not been loaded by the control processing application, determining whether the input data is present in a buffer memory of the controller; and when it is determined that the input data is present in the buffer memory, loading the input data to the control processing application.

In an example embodiment, the coherence time of the one or more data qubits is a length of time a respective state of each of data qubit of the one or more data qubits is maintainable.

In an example embodiment, the quantum system controller comprises a time generator configured to provide synchronizing signals configured to cause the synchronized execution of two or more time-indexed commands of the first set of commands at a respective time.

In an example embodiment, the quantum processor is an atomic object confinement apparatus and the one or more data qubits and the one or more ancilla qubits are atomic objects confined by the atomic object confinement apparatus.

In an example embodiment, prior to reading an ancilla qubit of the one or more ancilla qubits, a quantum interaction is caused between the ancilla qubit and a respective data qubit that does not affect a quantum state of the respective data qubit.

In an example embodiment, reading an ancilla qubit of the one or more ancilla qubits comprises determining a quantum state of the ancilla qubit based on an optical signal corresponding to the ancilla qubit captured by one or more collection optics elements.

In an example embodiment, the input data is stored to a buffer memory of the controller by an analog-to-digital converter that received an electrical signal generated based on the optical signal.

In an example embodiment, the one or more data qubits of a first logical qubit are acted on with a same type of gate at approximately the same time.

In an example embodiment, execution of at least one command of the first set of commands causes at least one of (a) a voltage source to provide a control signal to at least one electrode of the quantum processor or (b) a manipulation source to provide manipulation signal to at least one data qubit of the quantum processor.

According to another aspect of the present disclosure, a quantum system controller configured to perform real-time, near real-time, and/or in-situ quantum error correction is provided. In an example embodiment, the quantum system controller comprises a processing device comprising at least one first processing element; a time-indexed command (TIC) sequencer comprising at least one second processing element; a plurality of driver controller elements, each driver controller element (a) configured to control the operation of a respective component of a quantum computer and (b) associated with a respective buffer and a respective processing element. The processing device is configured to generate a first set of commands configured to cause a quantum processor of the quantum computer to perform a first portion of a quantum circuit using one or more logical qubits of the quantum processor, each logical qubit of the one or more logical qubits comprising one or more data qubits and cause the first set of commands to be provided to the TIC sequencer. The TIC sequencer is configured to cause the time-indexed execution of the first set of commands by generating a time ordered queue of TICs to be performed by a respective driver controller element of the plurality of driver controller elements in the associated respective buffer for time-indexed execution by the associated respective processing element, wherein the time-indexed execution of the first set of commands causes the quantum computer to perform the first portion of the quantum circuit using the one or more logical qubits. The processing device is further configured to determine that input data is required prior to generation of a second set of commands, wherein the second set of commands is configured to cause the quantum processor to at least perform a second portion of the quantum circuit using the one or more logical qubits of the quantum processor, wherein generating the input data comprises reading one or more ancilla qubits of the quantum processor and the input data corresponds to quantum states of at least one of the one or more data qubits after performance of a respective action. The processing device is further configured to, responsive to determining that the input data is required prior to the generation of the second set of commands, access the input data. The processing device is further configured to process the input data, generate the second set of commands based on a result of processing the input data, and cause the second set of commands to be provided to the TIC sequencer for time-indexed execution of the second set of commands by respective driver controller elements within the coherence time of the one or more data qubits, the coherence time being with respect to the respective action.

In an example embodiment, the second set of commands comprises at least one quantum error correction command.

In an example embodiment, execution of the at least one quantum error correction command by an appropriate processing element causes a software-based quantum error correction to be performed.

In an example embodiment, performing the software-based quantum error correction comprises updating a register stored in a memory of the quantum system controller and corresponding to a particular data qubit or a particular logical qubit of the quantum processor to track quantum errors accumulated by the particular data qubit or the particular logical qubit.

In an example embodiment, execution of at least one quantum error correction command by an appropriate processing element causes a correction to be actively or physical performed on a particular data qubit or a particular logical qubit.

In an example embodiment, the correction is selected or determined based on a cumulative error of the particular data qubit or the particular logical qubit as indicated by a register stored in a memory of the quantum system controller and corresponding to the particular data qubit or the particular logical qubit.

In an example embodiment, a register stored in a memory of the quantum system controller and corresponding to the particular data qubit or the particular logical qubit is updated based on the performance of the correction.

In an example embodiment, execution of at least one quantum error correction command by an appropriate processing element causes a gate to be applied to at least a particular data qubit or a particular logical qubit to be modified based at least in part a cumulative error indicated by a register stored in the memory of the quantum system controller and corresponding to the particular data qubit of the particular logical qubit.

In an example embodiment, the register is updated based on the gate being applied to the particular data qubit or the particular logical qubit.

In an example embodiment, accessing the input data comprises determining whether the input data has been loaded by a control processing application being executed by the processing device; responsive to determining that the input data has been loaded by the control processing application, beginning analyzing the input data; responsive to determining that the input data has not been loaded by the control processing application, determining whether the input data is present in a buffer memory of the controller; and when it is determined that the input data is present in the buffer memory, loading the input data to the control processing application.

In an example embodiment, the coherence time of the one or more data qubits is a length of time a respective state of each of data qubit of the one or more data qubits is maintainable.

In an example embodiment, the quantum system controller comprises a time generator configured to provide synchronizing signals configured to cause the synchronized execution of two or more time-indexed commands of the first set of commands at a respective time.

In an example embodiment, the quantum processor is an atomic object confinement apparatus and the one or more data qubits and the one or more ancilla qubits are atomic objects confined by the atomic object confinement apparatus.

In an example embodiment, prior to reading an ancilla qubit of the one or more ancilla qubits, a quantum interaction is caused between the ancilla qubit and a respective data qubit that does not affect a quantum state of the respective data qubit.

In an example embodiment, reading an ancilla qubit of the one or more ancilla qubits comprises determining a quantum state of the ancilla qubit based on an optical signal corresponding to the ancilla qubit captured by one or more collection optics elements.

In an example embodiment, the input data is stored to a buffer memory of the controller by an analog-to-digital converter that received an electrical signal generated based on the optical signal.

In an example embodiment, the one or more data qubits of a first logical qubit are acted on with a same type of gate at approximately the same time.

In an example embodiment, execution of at least one command of the first set of commands causes at least one of (a) a voltage source to provide a control signal to at least one electrode of the quantum processor or (b) a manipulation source to provide manipulation signal to at least one data qubit of the quantum processor.

According to another aspect of the present disclosure, a quantum computer is provided. The quantum computer comprises a quantum system controller configured to perform real-time, near real-time, and/or in-situ quantum error correction is provided. The quantum computer further comprises a plurality of components configured to be operated by and/or the operation thereof is controlled by the quantum system controller. In an example embodiment, the quantum system controller comprises a processing device comprising at least one first processing element; a time-indexed command (TIC) sequencer comprising at least one second processing element; a plurality of driver controller elements, each driver controller element (a) is configured to control the operation of a respective component of the plurality of components of the quantum computer and (b) associated with a respective buffer and a respective processing element. The processing device is configured to generate a first set of commands configured to cause a quantum processor of the quantum computer to perform a first portion of a quantum circuit using one or more logical qubits of the quantum processor, each logical qubit of the one or more logical qubits comprising one or more data qubits and cause the first set of commands to be provided to the TIC sequencer. The TIC sequencer is configured to cause the time-indexed execution of the first set of commands by generating a time ordered queue of TICs to be performed by a respective driver controller element of the plurality of driver controller elements in the associated respective buffer for time-indexed execution by the associated respective processing element, wherein the time-indexed execution of the first set of commands causes the quantum computer to perform the first portion of the quantum circuit using the one or more logical qubits. The processing device is further configured to determine that input data is required prior to generation of a second set of commands, wherein the second set of commands is configured to cause the quantum processor to at least perform a second portion of the quantum circuit using the one or more logical qubits of the quantum processor, wherein generating the input data comprises reading one or more ancilla qubits of the quantum processor and the input data corresponds to quantum states of at least one of the one or more data qubits after performance of a respective action. The processing device is further configured to, responsive to determining that the input data is required prior to the generation of the second set of commands, access the input data. The processing device is further configured to process the input data, generate the second set of commands based on a result of processing the input data, and cause the second set of commands to be provided to the TIC sequencer for time-indexed execution of the second set of commands by respective driver controller elements within the coherence time of the one or more data qubits, the coherence time being with respect to the respective action.

In an example embodiment, the second set of commands comprises at least one quantum error correction command.

In an example embodiment, execution of the at least one quantum error correction command by an appropriate processing element causes a software-based quantum error correction to be performed.

In an example embodiment, performing the software-based quantum error correction comprises updating a register stored in a memory of the quantum system controller and corresponding to a particular data qubit or a particular logical qubit of the quantum processor to track quantum errors accumulated by the particular data qubit or the particular logical qubit.

In an example embodiment, execution of at least one quantum error correction command by an appropriate processing element causes a correction to be actively or physical performed on a particular data qubit or a particular logical qubit.

In an example embodiment, the correction is selected or determined based on a cumulative error of the particular data qubit or the particular logical qubit as indicated by a register stored in a memory of the quantum system controller and corresponding to the particular data qubit or the particular logical qubit.

In an example embodiment, a register stored in a memory of the quantum system controller and corresponding to the particular data qubit or the particular logical qubit is updated based on the performance of the correction.

In an example embodiment, execution of at least one quantum error correction command by an appropriate processing element causes a gate to be applied to at least a particular data qubit or a particular logical qubit to be modified based at least in part a cumulative error indicated by a register stored in the memory of the quantum system controller and corresponding to the particular data qubit of the particular logical qubit.

In an example embodiment, the register is updated based on the gate being applied to the particular data qubit or the particular logical qubit.

In an example embodiment, accessing the input data comprises determining whether the input data has been loaded by a control processing application being executed by the processing device; responsive to determining that the input data has been loaded by the control processing application, beginning analyzing the input data; responsive to determining that the input data has not been loaded by the control processing application, determining whether the input data is present in a buffer memory of the controller; and when it is determined that the input data is present in the buffer memory, loading the input data to the control processing application.

In an example embodiment, the coherence time of the one or more data qubits is a length of time a respective state of each of data qubit of the one or more data qubits is maintainable.

In an example embodiment, the quantum system controller comprises a time generator configured to provide synchronizing signals configured to cause the synchronized execution of two or more time-indexed commands of the first set of commands at a respective time.

In an example embodiment, the quantum processor is an atomic object confinement apparatus and the one or more data qubits and the one or more ancilla qubits are atomic objects confined by the atomic object confinement apparatus.

In an example embodiment, prior to reading an ancilla qubit of the one or more ancilla qubits, a quantum interaction is caused between the ancilla qubit and a respective data qubit that does not affect a quantum state of the respective data qubit.

In an example embodiment, reading an ancilla qubit of the one or more ancilla qubits comprises determining a quantum state of the ancilla qubit based on an optical signal corresponding to the ancilla qubit captured by one or more collection optics elements.

In an example embodiment, the input data is stored to a buffer memory of the controller by an analog-to-digital converter that received an electrical signal generated based on the optical signal.

In an example embodiment, the one or more data qubits of a first logical qubit are acted on with a same type of gate at approximately the same time.

In an example embodiment, execution of at least one command of the first set of commands causes at least one of (a) a voltage source to provide a control signal to at least one electrode of the quantum processor or (b) a manipulation source to provide manipulation signal to at least one data qubit of the quantum processor.

In an example embodiment, the plurality of components comprise a plurality of voltage sources, a plurality of manipulation sources, and components of an optics collection system.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a schematic diagram illustrating an example quantum computing system comprising a quantum system controller according an example embodiment.

FIG. 2 provides a schematic diagram of an example quantum system controller of a quantum computer configured to perform one or more deterministic reshaping and/or reordering functions, according to various embodiments.

Figure 8A:
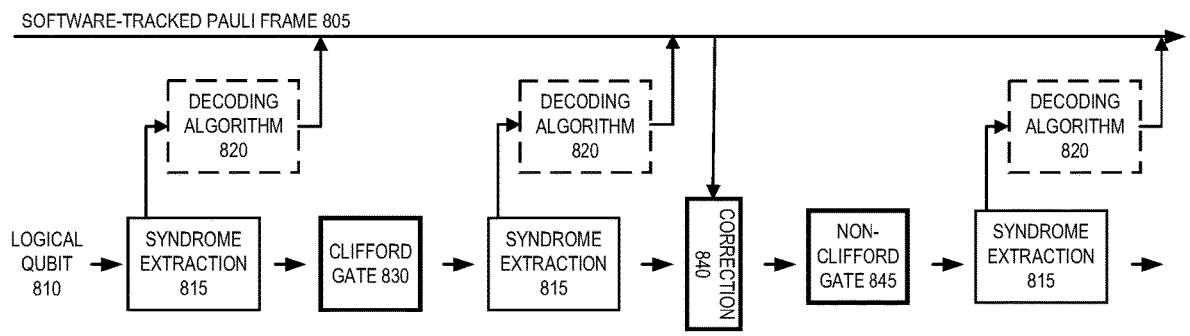
Figure 8B:
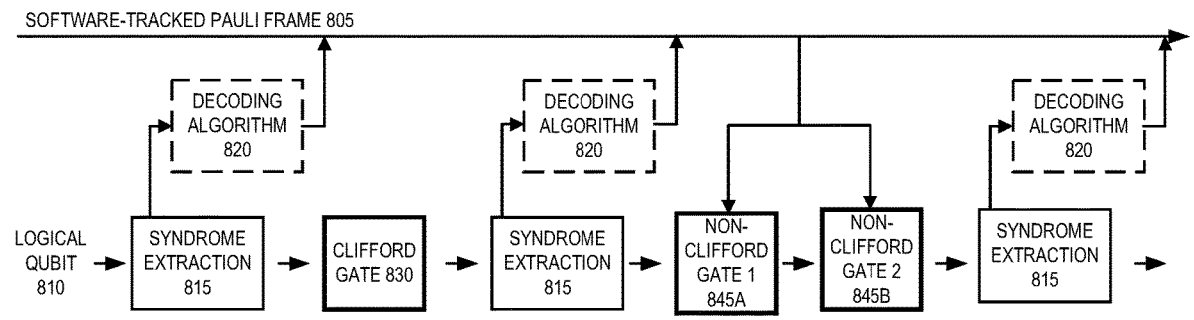

FIGS. 8A and 8B provide schematic diagrams illustrating two example processes of affecting quantum error correction, according to various embodiments.

Figure 9:
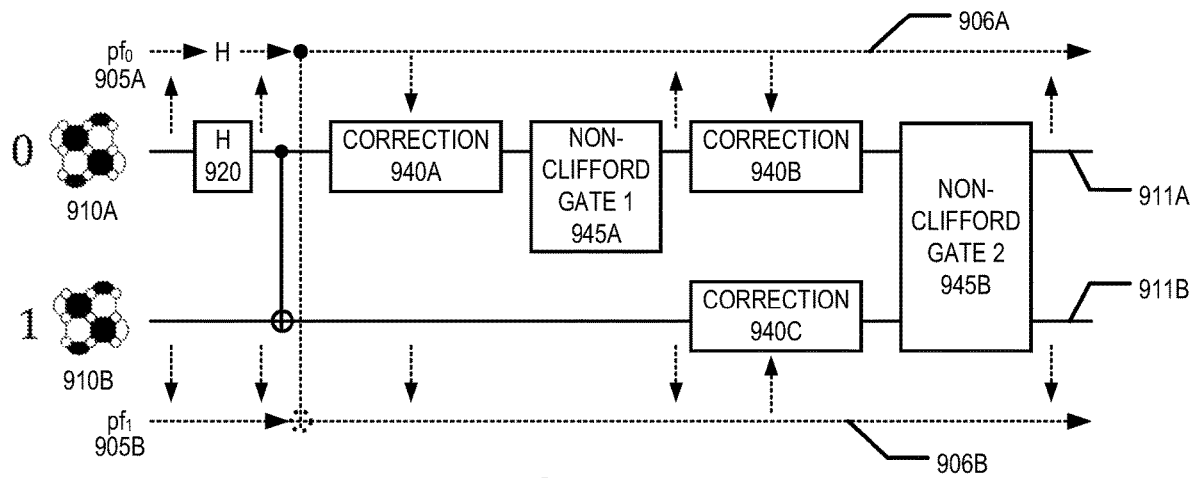

FIG. 9 provides a schematic diagram illustrating example processes of affecting quantum error correction on two logical qubits, according to various embodiments.

Figure 10A:
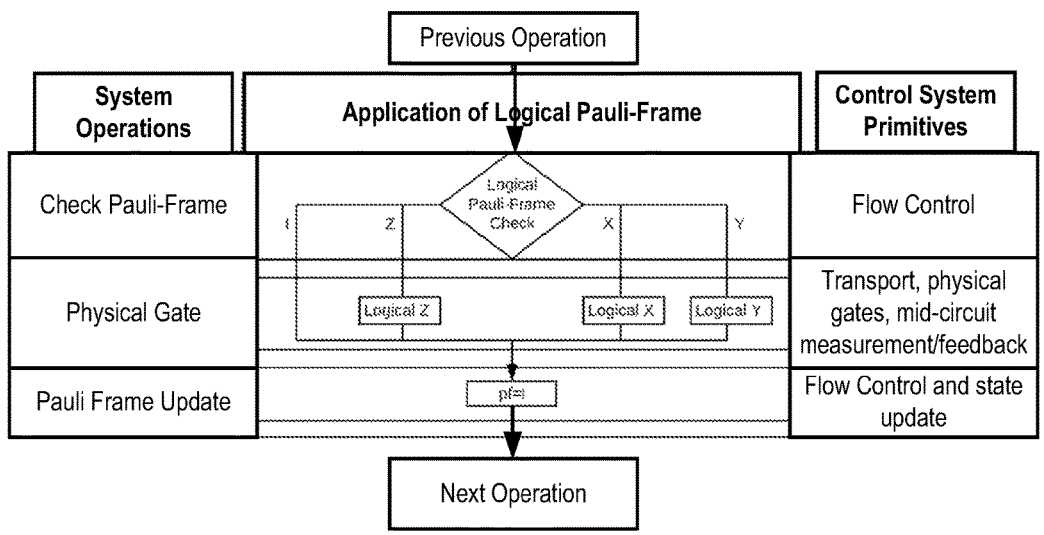
Figure 10B:
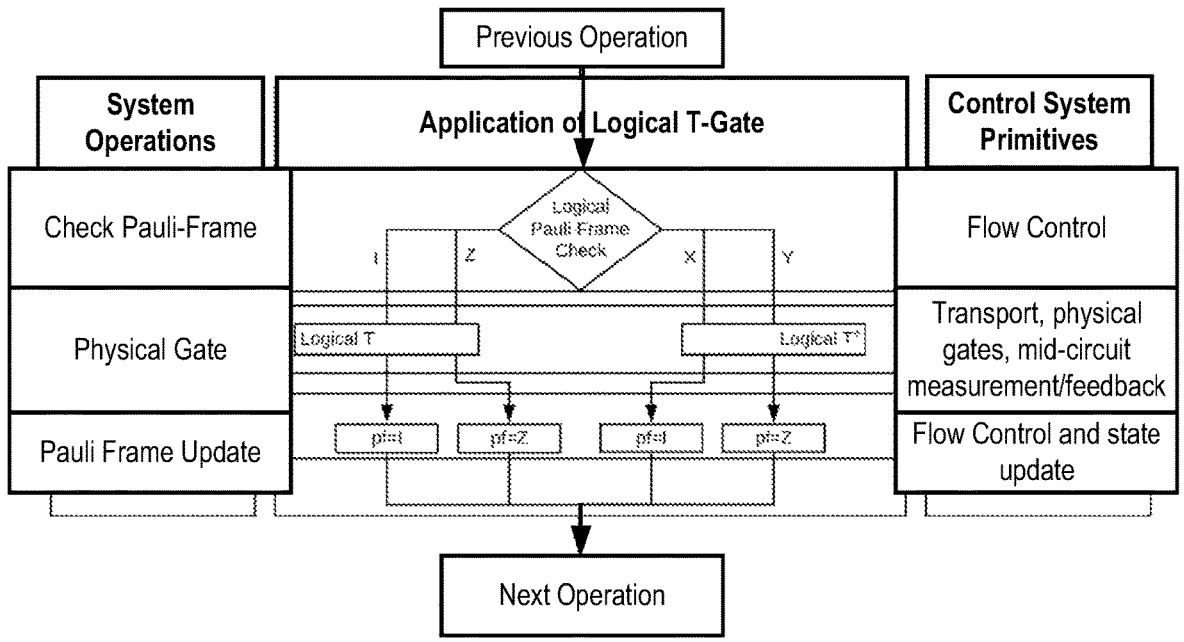
Figure 10C:
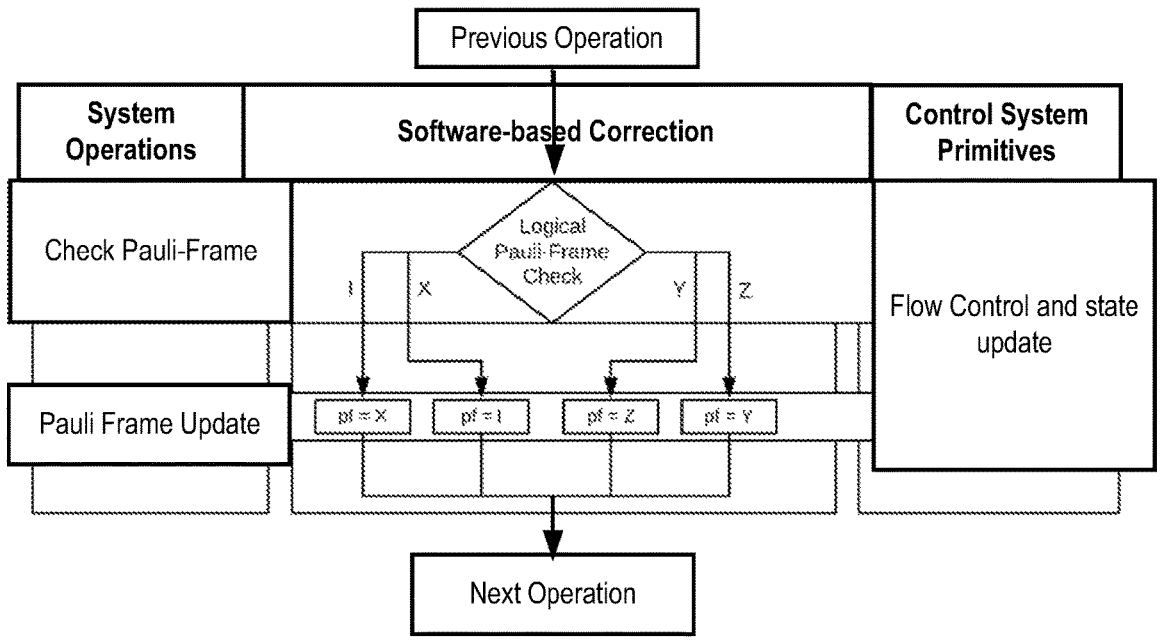

FIGS. 10A, 10B, and 10C schematically illustrate examples of performing quantum error correction for various types of quantum errors, according to an example embodiment.

Figure 11:
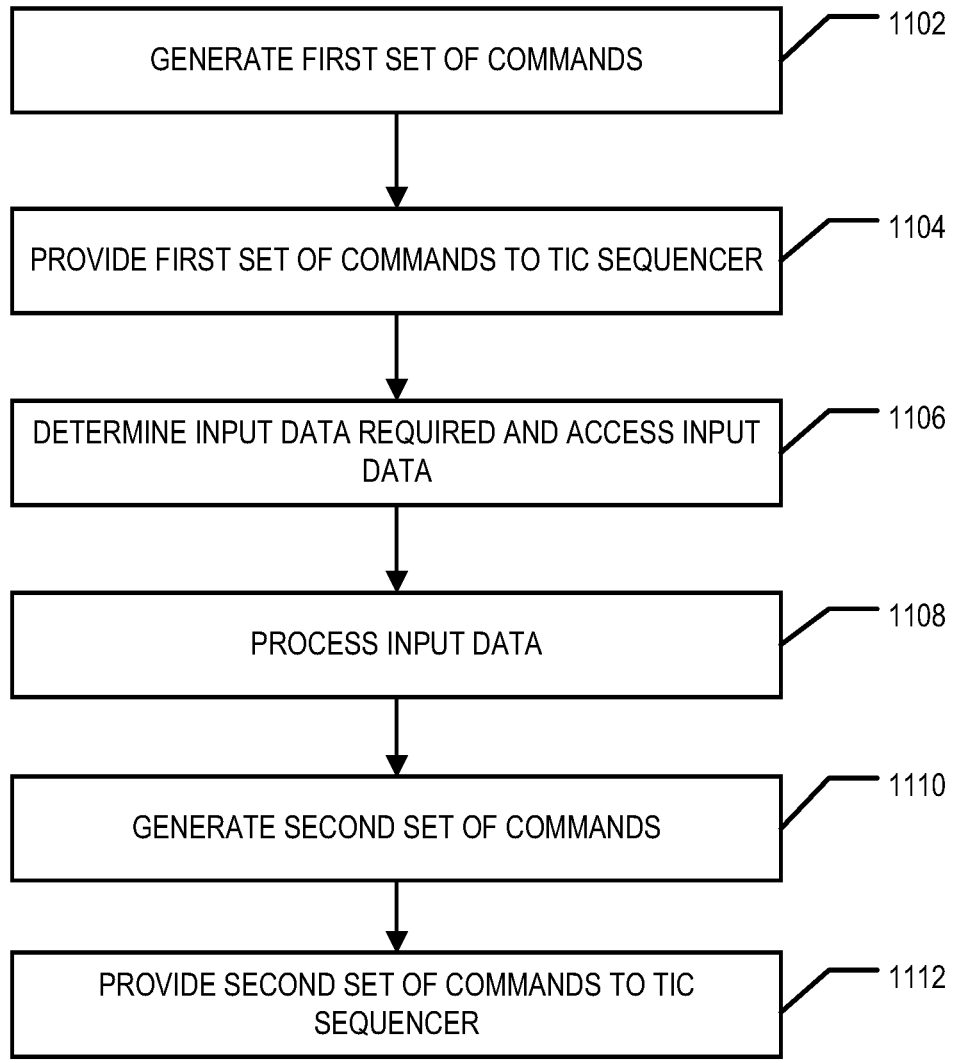

FIG. 11 provides a flowchart of processes, procedures, operations, and/or the like performed, for example, by a processing device of a quantum system controller, according to various embodiments.

Figure 12:
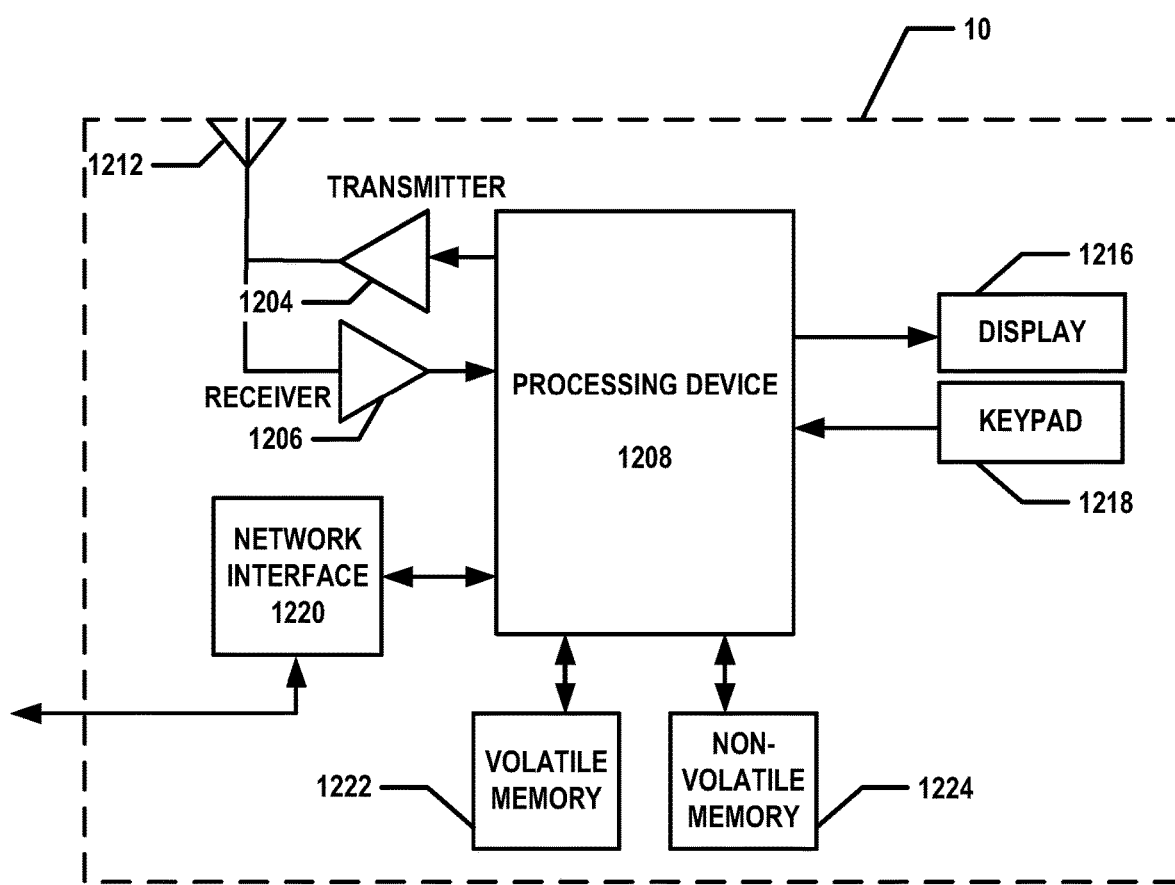

FIG. 12 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

Example embodiments provide methods, systems, apparatuses, computer program products and/or the like for performing quantum error correction. For example, various embodiments provide methods, systems, apparatuses, computer program products, and/or the like for determining quantum errors that are and/or are likely present in computations performed using a quantum processor and to address and/or correct the determined quantum errors. For example, various embodiments provide a quantum system controller for a quantum computer that is configured for performing quantum error correction. For example, various embodiments provide methods for performing and/or enabling the performance of quantum error correction by a quantum system controller of a quantum computer.

In various embodiments, the quantum system controller of the quantum computer comprises a classical and/or semiconductor-based processing device configured to generate a first set of commands. In various embodiments, the time-indexed execution of the first set of commands cause the transport of one or more qubits within the quantum processor, one or more quantum gates to be performed on one or more qubits, the interaction of one or more data qubits being evolved along a path of the quantum circuit with one or more ancilla qubits, cause one or more qubits (e.g., data qubits, ancilla qubits, and/or the like) to be read, and/or the like. For example, the time-indexed execution of the first set of commands causes the quantum processor of the quantum computer to perform a first portion of a quantum circuit. In various embodiments, the processing device is configured to receive and process input data corresponding to and/or indicating the quantum state(s) of one or more physical and/or logical qubits of the quantum processor of the quantum computer. In various embodiments, the quantum system controller generates a first set of commands corresponding to the performance of a first portion of a quantum circuit, and, based on analyzing and/or processing input data corresponding to and/or indicating the quantum state(s) of one or more physical and/or logical qubits of the quantum processor of the quantum computer after performance of the first portion of the quantum circuit, the quantum system controller generates a second set of commands that includes software and/or physical corrections for one or more quantum errors corresponding to one or more data qubits of the quantum processor.

In various embodiments, the quantum processor comprises a plurality of physical qubits (e.g., atomic objects such as ions) that are evolved along one or more wires of the quantum circuit. In various embodiments, some of the physical qubits are used as data qubits that are evolved in a controlled manner to perform the quantum computation corresponding to the quantum circuit. In various embodiments, some of the physical qubits are used as ancilla qubits. For example, the ancilla qubits can be used to extract information mid-circuit from the data qubits.

In various embodiments, the data qubits are grouped or organized into logical qubits. In various embodiments, a logical qubit comprises a plurality of data qubits that are acted upon by the same type of gates at approximately the same time. For example, each data qubit of a logical qubit are evolved in the same manner through a quantum circuit. In other words, each data qubit of a logical qubit are evolved along the same wire of the quantum circuit. In various embodiments, a block or group of data qubits may correspond to a single logical qubit or multiple (e.g., two or more) logical qubits.

In various embodiments, ancilla qubits (e.g., atomic objects such as ions) of the quantum processor are caused to interact with data qubits of the quantum processor and then read (e.g., have a reading manipulation beam incident thereon and then the ancilla qubit is monitored for emission or lack of emission of photons) to determine a quantum state of the ancilla qubit and the data qubit that was caused to interact with the ancilla qubit. In various embodiments, an ancilla qubit is used for interactions with a single data qubit, multiple (e.g., two or more) data qubits that are associated with the same logical qubit, or multiple (e.g., two or more) data qubits that are (collectively) associated with two or more logical qubits. Based on processing and/or analysis of values and/or input data determined by reading one or more ancilla qubits, the processing device of the quantum system controller generates a second set of commands that are configured to address, compensate for, and/or correct one or more quantum errors that are likely to be present in the evolution of one or more data qubits of the quantum processor (e.g., based on the analysis and/or processing of determined quantum states of the one or more ancilla qubits).

In various embodiments, the second set of commands comprises one or more commands that address, compensate for, and/or correct one or more errors that are likely to be present in the evolution of the one or more data qubits using software corrections and/or physical corrections of the one or more data qubits. In various embodiments, the physical corrections comprise corrections applied directly to the qubit (e.g., rotating a qubit, modifying the phase of a quantum state of the qubit, and/or the like) and/or modifying a gate to be applied to the data qubit (e.g., rotating the gate with respect to the reference frame of the data qubit, and/or the like).

For example, in various embodiments, the processing device is configured to receive and process the input data and generate a second set of commands such that at least a portion of the second set of commands is executed (e.g., in a time-indexed manner) by the quantum system controller within a coherence time for the qubit with respect to when the input data was collected. For example, in various embodiments, the time-ordered execution of the second set of commands causes a second portion of the quantum circuit to be performed. In some instances, the second set of commands comprises commands that, when executed by the quantum system controller, causes one or more corrections and/or modifications of gates to be applied to one or more data qubits of the quantum processor. For example, applying a correction to a qubit of the quantum processor may include rotating a qubit, modifying the phase of a quantum state of the qubit, and/or the like. In various embodiments, modification of a gate to be applied to a data qubit may include rotating the gate within the reference frame of the qubit, and/or the like. The correction(s) and modification(s) of the gate(s) are configured to correct one or more quantum errors experienced and/or likely experienced by the data qubit being acted upon. In an example embodiment, at least some of the quantum error correction is performed via software corrections applied to individual qubit registers stored by the quantum system controller.

In various embodiments, the processing device is configured to perform real-time and/or near real-time tracking of an error state of each data qubit (e.g., in a respective qubit register stored by the quantum system controller). Thus, in an example embodiment, rather than just applying a final, discrete correction to a data qubit, the quantum system controller performs (near) real-time tracking of corrections that are necessary to change a gate that would need to be done to execute the intended quantum circuit. The quantum system controller can therefore modify operations for executing the quantum circuit based on the (near) real-time tracked error states and/or tracked corrections of respective data qubits in (near) real-time as the quantum circuit is executed. The applied corrections may not absolutely correct the error associated with a data qubit, thus the error state of the data qubit (e.g., stored by a respective qubit register) is updated based on the applied correction such that the error state of the data qubit reflects the current error state of the data qubit.

In various embodiments, the quantum processor can take a variety of forms. For example, the quantum processor may comprise various types of data qubits such as trapped atomic objects (e.g., confined in an atomic object confinement apparatus such as an ion trap), Josephine junctions, quantum dot spins and/or electron localization, and/or other types of qubits. In various embodiments, a quantum circuit is configured to control the evolution of the quantum state of the data qubits such that one or more computations are performed via the performance of the quantum circuit by the quantum processor. In various embodiments, the second set of commands comprises commands configured to cause one or more quantum error corrections to be applied and/or to cause a second portion of the quantum circuit to be performed.

Large-scale quantum computers (e.g., comprising hundreds to thousands of qubits) are expected to solve problems that are currently intractable with classical and/or small scale quantum computer (e.g., comprising tens of qubits) technology, such as in the fields of chemistry, material science, and biology. Solving such problems will entail computations employing quantum algorithms implemented using deep quantum circuits. Obtaining the necessary levels of accuracy for these deep circuits requires high levels of reliability for the quantum operations. To achieve such reliability, quantum error correction (QEC) may be employed during computations to suppress noise to required levels. Implementing such computations that utilize QEC will require a capable quantum system controller. In particular, the quantum system controller will need to be able to determine quantum errors that are likely present with one or more data qubits, determining corrections (e.g., software corrections and/or active quantum error corrections) to address the quantum errors, and to enact the quantum error correction in real-time and/or near real-time as the quantum circuit is being performed. For example, a quantum error correction may be performed between the performance of two gates on a data qubit. For example, a quantum error correction may need to be performed in a time period that is less than the coherence time of a data qubit. Thus, various embodiments provide technical solutions to the technical problem of how to enable a quantum system controller to perform quantum error correction (e.g., within a coherence time of a corresponding data qubit) such that the performance of the quantum computer is improved.

For example, various embodiments provide a quantum system controller and/or corresponding methods that enable quantum error correction by translating and reordering conditional gates and classical logic from a quantum description to serialized, potentially conditional, operations to be performed by a quantum processor. The translation converts general quantum gates to the gates that are performable by the quantum processor and aligns the number of operations to the parallelism that is allowed on the quantum processor. The quantum system controller places (e.g., at physical locations within the quantum processor, for example) and orders both quantum and classical operations to maximize parallelism on the quantum processor, minimize execution time and heating (e.g., introduction of thermal noise), all while ensuring any dependencies are preserved.

Figure 1:
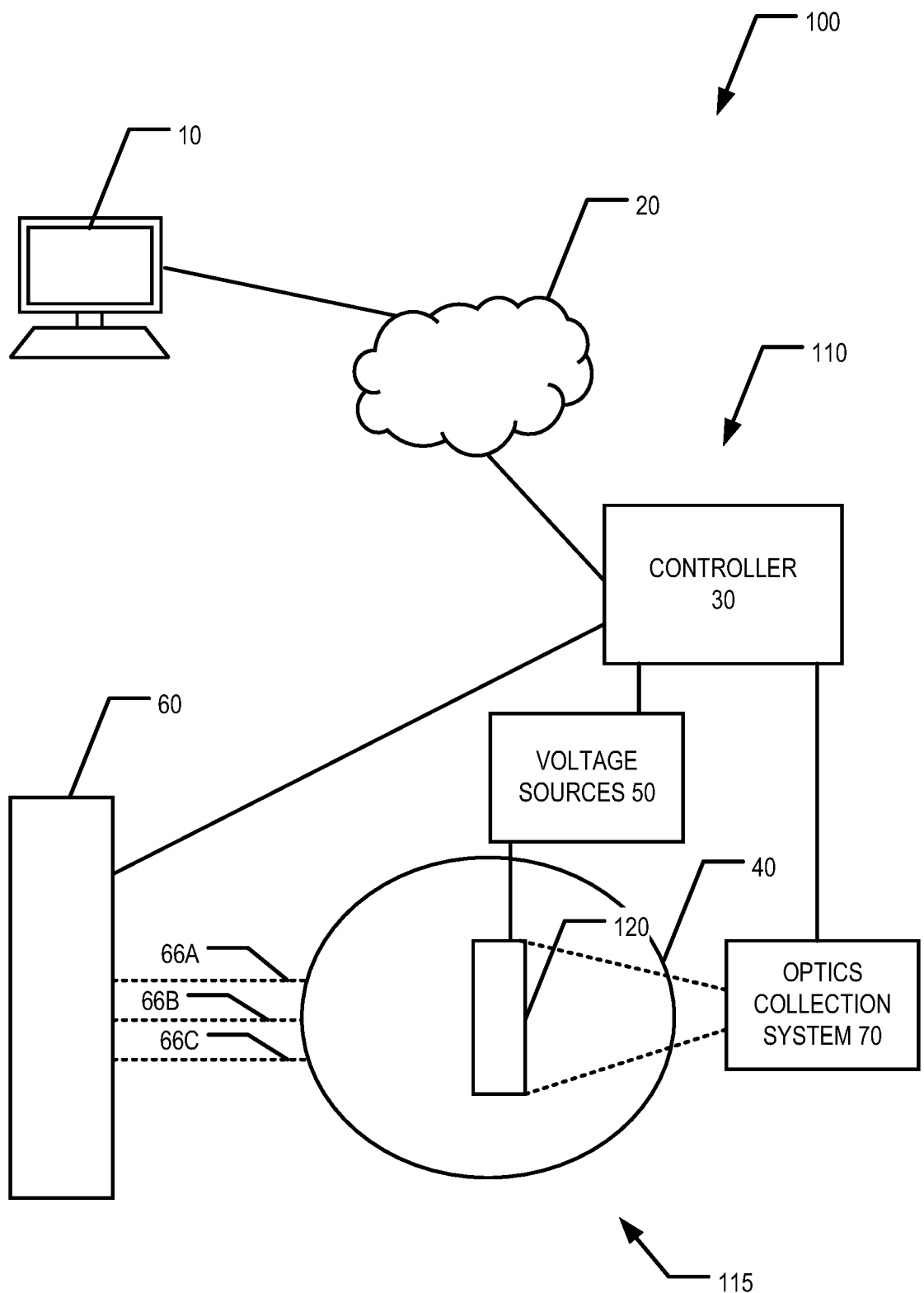

Exemplary Quantum Computing System Comprising an Atomic Object Confinement Apparatus FIG. 1 provides a schematic diagram of an example quantum computing system 100 where the quantum processor comprises an atomic object confinement apparatus 120 (e.g., an ion trap and/or the like) having a plurality of atomic objects (e.g., atoms, ions, and/or the like) confined therein, in accordance with an example embodiment. In various embodiments, the quantum computing system 100 comprises a computing entity 10 and a quantum computer 110. In various embodiments, the quantum computer 110 comprises a quantum system controller 30 and a quantum processor 115. In various embodiments, the quantum system controller 30 is configured, programmed, and/or the like to control the quantum processor 115. In an example embodiment, the quantum processor 115 comprises a plurality of qubits (e.g., data qubits that may be organized into logical qubits, ancilla qubits, and/or the like).

In various embodiments, the quantum processor 115 comprises means for controlling the evolution of quantum states of the qubits. For example, in an example embodiment, the quantum processor 115 comprises a cryostat and/or vacuum chamber 40 enclosing a confinement apparatus 120 (e.g., an ion trap), one or more manipulation sources 60, one or more voltage sources 50, and/or one or more optics collection systems 70. For example, the cryostat and/or vacuum chamber 40 may be a temperature and/or pressure-controlled chamber. In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more atomic objects within the confinement apparatus. In various embodiments, the atomic objects within the atomic confinement apparatus (e.g., ions trapped within an ion trap) act as the data qubits and/or ancilla qubits of the quantum processor 115 of the quantum computer 110. For example, in an example embodiment, wherein the one or more manipulation sources 60 comprise one or more lasers, the lasers may provide one or more laser beams to atomic objects trapped within the confinement apparatus 120 within the cryostat and/or vacuum chamber 40. For example, the manipulation sources 60 may generate and/or provide laser beams configured to ionize atomic objects, initialize atomic objects within the defined two state qubit space of the quantum processor, perform gates one or more qubits of the quantum processor, read a quantum state of one or more qubits of the quantum processor, and/or the like.

In various embodiments, the quantum computer 110 comprises an optics collection system 70 configured to collect and/or detect photons generated by qubits (e.g., during reading procedures). The optics collection system 70 may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the qubits of the quantum computer 110. In various embodiments, the detectors may be in electronic communication with the quantum system controller 30 via one or more A/D converters 225 (see FIG. 2) and/or the like.

In various embodiments, the quantum computer 110 comprises one or more voltage sources 50. For example, the voltage sources 50 may comprise a plurality of voltage drivers and/or voltage sources and/or at least one RF driver and/or voltage source. The voltage sources 50 may be electrically coupled to the corresponding potential generating elements (e.g., electrodes) of the confinement apparatus 120, in an example embodiment.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the quantum system controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms and/or circuits, and/or the like into a computing language, executable instructions, command sets, and/or the like that the quantum system controller 30 can understand and/or implement.

In various embodiments, the quantum system controller 30 is configured to control the voltage sources 50, cryostat system and/or vacuum system controlling the temperature and pressure within the cryostat and/or vacuum chamber 40, manipulation sources 60, and/or other systems controlling various environmental conditions (e.g., temperature, pressure, and/or the like) within the cryostat and/or vacuum chamber 40 and/or configured to manipulate and/or cause a controlled evolution of quantum states of one or more atomic objects within the confinement apparatus. For example, the quantum system controller 30 may cause a controlled evolution of quantum states of one or more atomic objects within the confinement apparatus to execute a quantum circuit and/or algorithm. For example, the quantum system controller 30 may cause a reading procedure comprising coherent shelving to be performed, possibly as part of executing a quantum circuit and/or algorithm. Additionally, the quantum system controller 30 is configured to communicate and/or receive input data from the optics collection system 70 and corresponding to the reading of the quantum state of qubits of the quantum computer 110. In various embodiments, the atomic objects confined within the confinement apparatus are used as qubits of the quantum computer 110.

Exemplary Architecture of a Quantum System Controller

In various embodiments, a quantum computer 110 comprises a quantum system controller 30 and a quantum controller 115. The quantum system controller 30 is configured to control various components of a quantum processor 115. Various embodiments provide a quantum system controller 30 is configured to perform one or more quantum error correction. For example, various embodiments are configured to perform one or more quantum error corrections for one or more data qubits in real-time and/or near real-time with respect to the occurrence of one or more quantum errors experienced by the one or more data qubits. For example, the quantum system controller 30 is configured to perform the quantum error correction within the coherence time of the one or more data qubits to which the quantum error correction is being performed and/or pertains.

In various embodiments, the quantum system controller 30 is in communication with an optics collection system 70 such that the quantum system controller 30 is configured to receive input data captured and/or generated by the optics collection system 70. The quantum system controller 30 is further configured to perform quantum error correction via a software-based correction and/or via the physical application of a quantum error correction to one or more data qubits (e.g., by controlling of one or more voltage sources 50 and/or manipulation sources 60). In various embodiments, the quantum system controller 30 is further configured to control a cryostat system and/or vacuum system controlling the temperature and pressure within the cryostat and/or vacuum chamber 40, cooling system, and/or other systems controlling the environmental conditions (e.g., temperature, humidity, pressure, and/or the like) within the cryostat and/or vacuum chamber 40.

Figure 2:
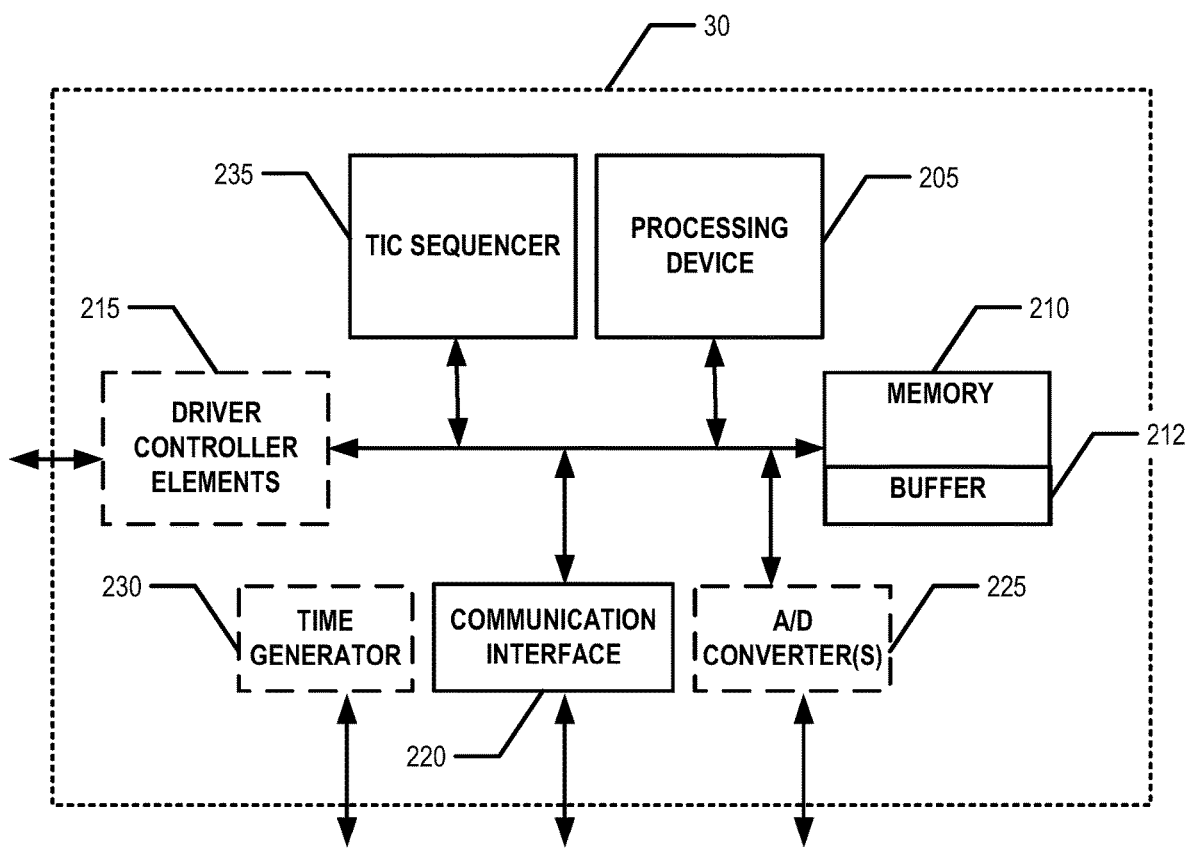

As shown in FIG. 2, in various embodiments, the quantum system controller 30 may comprise various quantum system controller elements including processing devices 205, memory 210, driver controller elements 215, a communication interface 220, analog-digital (A/D) converter elements 225, a time generator 230, a time-indexed command (TIC) sequencer 235, and/or the like. In various embodiments, the quantum system controller 30 is configured to receive input data generated by the optics collection system via the A/D converter(s) 225. In various embodiments, the processing device(s) 205 are configured to generate one or more TICs (e.g., the first and second set of commands) based, at least in part, on the input data and/or processing thereof. In various embodiments, the TIC sequencer 235 is configured to execute and/or cause execution of the TICs at the particular indexed times (e.g., based at least in part on signals generated by the time generator 230). In various embodiments, the TICs are executed by the driver controller elements 215 at the indexed times such that the driver controller elements 215 respectively control voltage sources 50 and/or manipulation sources 60 to cause the quantum processor 115 to perform at least a portion of the quantum circuit, quantum corrections, and/or the like.

In various embodiments, the processing devices 205 comprise processing elements such as programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing elements and/or circuitry, and/or the like. The term circuitry may refer to an entirely hardware embodiment or a combination of hardware and computer program products. In an example embodiment, a processing device 205 of the quantum system controller 30 comprises a clock and/or is in communication with a clock.

In various embodiments, the memory 210 comprises non-transitory memory such as volatile and/or non-volatile memory storage such as one or more of hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 210 may store a queue of commands to be executed to cause a quantum algorithm and/or circuit to be executed (e.g., an executable queue), qubit records corresponding the qubits of quantum computer (e.g., in a qubit record data store, qubit record database, qubit record table, and/or the like), a calibration table, computer program code (e.g., in a one or more computer languages, specialized quantum system controller language(s), and/or the like), and/or the like. In an example embodiment, execution of at least a portion of the computer program code stored in the memory 210 (e.g., by a processing device 205) causes the quantum system controller 30 to perform one or more steps, operations, processes, procedures and/or the like for generating one or more sets of commands (e.g., first and/or second set of commands) configured to cause the quantum processor 115 to perform at least a portion of a quantum circuit and/or perform a quantum correction; to update one or more physical and/or logical qubit registries; and/or the like. In an example embodiment, execution of at least a portion of the computer program code stored in the memory 210 (e.g., by a TIC sequencer 235) causes the quantum system controller 30 to cause one or more commands (e.g., of one or more sets of commands) to be performed in a time-indexed manner based at least in part on a clock of the quantum system controller and/or the time generator 230.

In various embodiments, the memory 210 comprises one or more buffers 212. In various embodiments, the TIC sequencer is configured to buffer TIC commands (e.g., of the first and/or second set of commands) for time-indexed performance and/or execution of the TIC commands by respective ones of the driver controller elements 215. For example, a buffer 212 may correspond to one driver controller element 215. The TIC commands to be performed by a respective driver controller element 215 are stored to the corresponding buffer 212. The respective driver controller element 215 then executes the commands stored to its corresponding buffer 212 in accordance with the indexed time associated with each command. For example, each command may indicate a time at which the command is to be executed by the respective driver controller element 215 such that the TICs are executed at the appropriate time, as determined based on one or more timing and/or clock signals (e.g., generated by the time generator 230). In various embodiments, the buffers 212 are first-in first-out (FIFO) buffers.

In various embodiments, the driver quantum system controller elements 215 include one or more drivers and/or quantum system controller elements each configured to control one or more drivers. In various embodiments, the driver quantum system controller elements 215 may comprise drivers and/or driver controllers. For example, the driver controllers may be configured to cause one or more corresponding drivers to be operated in accordance with executable instructions, commands, and/or the like generated, scheduled, and executed by the quantum system controller 30. For example, the processing device 205 may generate one or more commands to be performed by a first driver. The TIC sequencer 235 may schedule the one or more commands (e.g., associate and/or index the one or more commands with respective times). The driver controller element 215 configured to control the first driver may then execute the one or more commands in accordance with the respective time indices based at least in part on timing and/or clock signals generate by the time generator 230.

In various embodiments, the driver controller elements 215 enable the quantum system controller 30 to operate a voltage sources 50, manipulation sources 60, cooling system, vacuum systems, and/or the like. In various embodiments, the drivers may be laser drivers (e.g., configured to operate and/or control one or more manipulation sources 60); vacuum component drivers; drivers for controlling the flow of current and/or voltage applied to electrodes (e.g., configured to operate and/or control one or more voltage sources 50) used for maintaining and/or controlling the trapping potential of the confinement apparatus 120 (and/or other drivers for providing driver action sequences to potential generating elements of the confinement apparatus); cryostat and/or vacuum system component drivers; cooling system drivers, and/or the like.

In various embodiments, each driver controller element 215 comprises a processing element such as an FPGA and/or the like. To enable synchronized execution of TICs, a clock and synchronization signal and/or pulse are distributed across each driver controller element 215 of the system while minimizing skew. A global system time is established within each driver controller element 215 (e.g., the FPGA thereof) as a count incrementing at the clock rate (e.g., based on timing, clock, and/or synchronizing signals). In an example embodiment, in order to begin program execution (e.g., to initiate performance of a quantum circuit), a command is sent to each driver controller element 215 (e.g., the FPGA thereof) to indicate that the system time should begin counting from 0 on the epic of the next synchronization pulse. Thus, distributed time generation is established within the quantum system controller 30.

Each driver controller element 215 corresponds to an endpoint within the system (e.g., a component of a manipulation source 60, a component of a voltage source 50, a component of a cooling and/or vacuum system, a component of the optics collection system 70, and/or the like). Each endpoint within the quantum computer 110 represents an individual hardware control. Each endpoint has its own set of accepted micro-commands, in various embodiments. Examples include but are not limited to a voltage source 50 such as a direct digital synthesizer (DDS), component of an optics collection system 70 such as a photomultiplier tube (PMT), a component of a manipulation source 60 such as a laser driver and/or optical modulator switch, and/or general-purpose output (GPO). Individual commands for a DDS allow for setting power level, frequency and phase of a controlling signal generated thereby. Commands for a PMT interface include start/stop photon count and reset of count, in various embodiments. Commands for a GPO endpoint include setting and/or clearing one or more output lines. These output lines can be used to control external hardware in a manner synchronized with the quantum circuit execution.

In various embodiments, each driver controller element 215 (e.g., system endpoint) features a dedicated and/or corresponding buffer 212 (e.g., a FIFO buffer) to store many TICs in time-ordered sequence. The dedicated and/or corresponding buffer 212 provides distributed storage for TICs so that operations can be simultaneously executed in parallel across every driver controller 215 of the quantum system controller 30 and/or quantum computer 110.

In various embodiments, the quantum system controller 30 comprises means for communicating and/or receiving signals from one or more optical receiver components (e.g., of the optics collection system 70). For example, the quantum system controller 30 may comprise one or more analog-digital (A/D) converter elements 225 configured to receive signals from one or more optical receiver components (e.g., a photodetector of the optics collection system 70), calibration sensors, and/or the like. In various embodiments, the A/D converter elements 225 are configured to write the input data generated by converting the received signals generated by one or more optical receiver components of the optics collection system 70 to memory 210. In various embodiments, the portion of the memory 210 to which the A/D converter elements 225 are configured to write the input data is a portion of the memory 210 that is slated and/or assigned to an application operating on and/or being executed by a processing device 205 that is configured to analyze and/or process the input and generate a second set of commands and/or software-based quantum error correction commands based at least in part on the analyzing and/or processing of the input data.

In various embodiments, the quantum system controller 30 may comprise a communication interface 220 for interfacing and/or communicating with a computing entity 10. For example, the quantum system controller 30 may comprise a communication interface 520 for receiving executable instructions, command sets, and/or the like from the computing entity 10 and providing output received from the quantum computer 110 (e.g., from an optics collection system 70) and/or the result of a processing the output to the computing entity 10. In various embodiments, the computing entity 10 and the quantum system controller 30 may communicate via a direct wired and/or wireless connection and/or via one or more wired and/or wireless networks 20.

In various embodiments, the quantum system controller 30 comprises a timing generator 230. In various embodiments, the timing generator 230 is configured to generate and provide a clock, timing, and/or synchronizing signals. The clock, timing, and/or synchronizing signals are received by the processing device(s) 205, memory 210, TIC sequencer 235, the driver controller elements 215, and/or other components of the quantum system controller 30. The TIC sequencer 235 and/or the driver controller elements 215 are configured to use the clock, timing, and/or synchronizing signals received thereby to synchronize the execution of TICs by the various driver controller elements 215 to act as a distributed clock. In various embodiments, the timing generator comprises a crystal oscillator, phase-locked loop, and/or the like configured to cause a periodic timing, clock, and/or synchronizing signal to be generated and provided.

For example, a dedicated buffer corresponding to a first driver controller element 215 stores a first TIC to be executed at a first time and a second TIC to be executed at a second time. A buffer corresponding to a second driver controller element 215 stores a third TIC to be executed at the first time and a buffer corresponding to a third driver controller element 215 stores a fourth TIC to be executed at the second time. The first, second, and third driver controller elements receive a timing, clock, and/or synchronizing signal indicating the first time. In response to registering the received timing, clock, and/or synchronizing signal indicating the first time, the first driver controller element executes the first TIC (and does not execute the second TIC) and the second driver controller element executes the third TIC in a synchronized manner. The third driver controller element registers the received timing, clock, and/or synchronizing signal indicating the first time and does not execute the fourth command. The first, second, and third driver controller elements then receive a timing, clock, and/or synchronizing signal indicating the second time. In response to registering the received timing, clock, and/or synchronizing signal indicating the second time, the first driver controller element executes the second TIC and the third driver controller element executes the fourth TIC in a synchronized manner. The second driver controller element registers the received timing, clock, and/or synchronizing signal indicating the second time and waits for the corresponding buffer to include additional TICs.

In various embodiments, the quantum system controller 30 further comprises a TIC sequencer 235. In various embodiments, the TIC sequencer 235 comprises processing elements such as CPLDs, microprocessors, coprocessing entities, ASIPs, integrated circuits, ASICs, FPGAs, PLAs, hardware accelerators, other processing elements and/or circuitry, and/or the like. In various embodiments, the TIC sequencer 235 comprises one or more processing devices that are configured to receive commands generated by the processing device(s) 205, index each of the commands and/or associate each of the commands with a respective time at which the respective command should be executed to generate TICs, and saves and/or stores each TIC to a respective buffer 212 corresponding to the driver controller element 215 intended to execute the respective TIC. For example, the TIC sequencer 235 is configured to store the TICs to be executed by a respective driver controller element 215 in the corresponding buffer 212 in a time ordered manner.

In various embodiments, the TICs enable the synchronized hardware operation of various components of the quantum system controller 30 (e.g., the driver controller elements 215). In various embodiments, a TIC is an atomic operation configured to be executed at a precise time which is synchronized across all hardware endpoints (e.g., driver controller elements 215) in the quantum system (e.g., the quantum computer 110). In various embodiments, a TIC comprises the time of execution (e.g., the indexed and/or associated time at which the TIC is to be executed), an endpoint ID configured to identify the endpoint (e.g. hardware element, driver controller element 215, and/or the like) that is intended to execute the command, command ID configured to identify the command to be executed (e.g., may be machine language code, a reference to a command stored in a local library stored by the driver controller element 215, and/or the like), and any data needed by the end point (e.g., driver controller element 215) to execute the command (e.g., one or more values that are inputs to the command).

Exemplary Operation of a Quantum System Controller

In various embodiments, the quantum system controller 30 is configured to control the operation of the quantum computer 110. For example, the quantum system controller 30 is configured to control the performance of operations by the quantum processor 115 to cause the quantum processor to perform one or more quantum computations via the performance of one or more quantum circuits. Both within quantum error correction logic and generally for overall program flow-control it is advantageous for the quantum system controller 30 to be able to control the application of gates and update of a classical state of the quantum processor, one or more logical qubits, one or more data qubits, one or more ancilla qubits, and/or the like. Thus, in various embodiments, the control flow is handled, at least in part, through the real-time or near real-time control mechanisms of the quantum system controller 30. In various embodiments, this enables dependency analysis used to re-order operations, grouping of operations to improve parallelism, selection of operations to be conditional operations or be a part of conditional blocks, and placement of operations to minimize the timing and increase the performance of the quantum circuits.

To enable the real-time or near real-time control flow, measurements that update classical state (e.g., of one or more logical qubits, one or more data qubits, one or more ancilla qubits, and/or the like) locally are replicated to other portions of the quantum computer 110 prior to when they are needed. To minimize the injection of additional delays across the operation of the quantum computer 110, the dependencies that we already tracked are used to inject the appropriate sends and receives across various elements of the quantum computer 110.

For example, in various embodiments, measurements that produce results that need to be distributed are flagged. The operations which depend on the values determined based on the measurements that produce results that need to be distributed may also be flagged for easy identification. For example, the measurements flagged for sending information (e.g., digital signal values) are distributed (e.g., by the component of the quantum computer 110 and/or quantum system controller 30 that generated the measurements) to other components of the quantum computer 110 and/or quantum system controller 30 that did not record and/or generate the measurement. Thus, components of the quantum system controller 30 that use a measurement that the component did not itself generate have quick and efficient access to the measurement. In various embodiments, every component of the quantum computer and/or quantum system controller 30 has a synchronization point injected prior to use to ensure that they have received the measurement and updated the appropriate classical state before progressing.

In various embodiments, the nominal execution mode of the quantum system controller 30 is to generate TICs, load up queues so that the TIC sequencer hardware (e.g., TIC sequencer 235) can actuate them at the right time, and cause the driver controller elements to execute the TICs at the appropriate times. However, when decisions are required for quantum error correction, this process is interrupted so that different corrective action can be taken based on mid-circuit measurements (e.g., based on syndrome extraction and decoding). The quantum system controller 30 is designed to quickly process the incoming measurement values (e.g., digital signal values and/or input data), make any required decisions, and resume command generation within the coherence time of the physical qubits (e.g., the data qubits the collectively make up the logical qubits of the quantum circuit).

Figure 3:
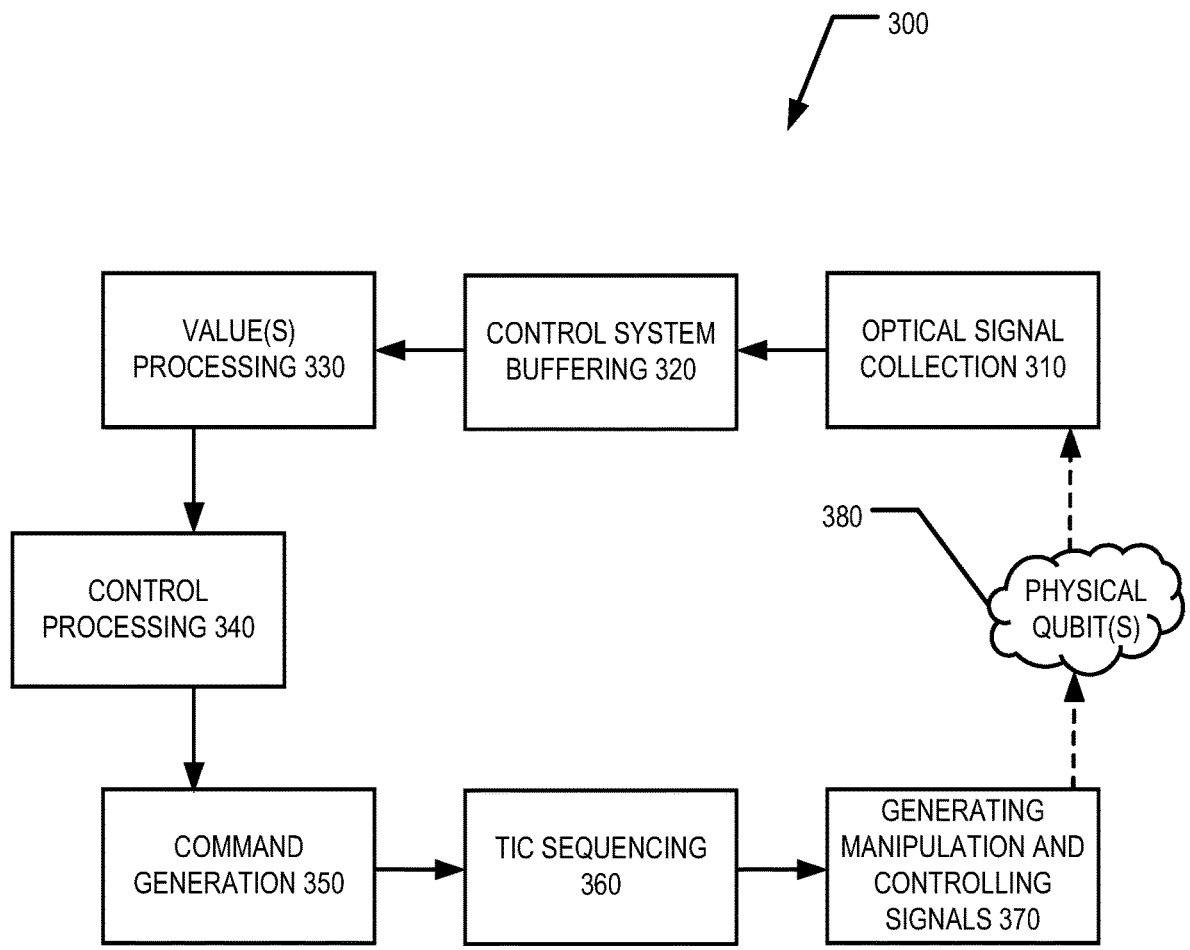
FIG. 3 is a schematic diagram of operations performed by a quantum system controller of FIG. 2, for example, to control operation of a quantum computer, according to various embodiments.

FIG. 3 illustrates an example process 300 that may be used by a quantum system controller 30 configured to perform control flow that includes real-time and/or in-situ quantum error correction. For example, the processing device 205 of the quantum system controller 30 performs control processing 340 to determine a next stage of a quantum circuit to be performed by the quantum processor, to identify one or more quantum errors that are likely to be present for one or more data qubits of the quantum processor, to determine one or more software-based and/or active quantum error corrections to be performed, and/or the like. the processing device 205 then performs command generation 350 to generate one or more commands configured to cause the quantum processor 115 to perform at least a portion of a quantum circuit, perform error correction (e.g., by updating a qubit registry via a software-based quantum error correction and/or by performing one or more data qubit corrections and/or quantum gate modifications to physically address the quantum error(s)), and/or the like. For example, during the command generation 350, the processing device 205 generates commands to cause the quantum processor 115 and/or the quantum system controller 30 to perform the processes identified and/or determine by the control processing 340.

The TIC sequencer 235 receives the commands generated by the processing device 205 during the command generation 350, and performs TIC sequencing 360. In various embodiments, the TIC sequencing 360 comprises time indexing the commands and/or associating the commands with times at which the commands should be executed to generate TICs. In various embodiments, the TIC sequencing 360 comprises determining which driver controller element 215 should execute each TIC and saving and/or storing each TIC to a respective buffer 212 that corresponds to the driver controller element 215 that should execute that TIC.

The driver controller elements 215 execute the TIC commands stored to their respective corresponding buffers 212 to cause one or more manipulation sources 60 to generate and provide manipulation signals and/or one or more voltage sources 50 to generate and provide controlling signals. the manipulation signals and/or controlling signals cause the transportation, controlled quantum state evolution, and/or quantum state reading and/or determination of one or more data qubits 380 of the quantum processor 115.

At various points in the performance of a quantum circuit, it may be necessary and/or desired to read one or more data qubits to determine the quantum state thereof and/or to read one or more ancilla qubits that have interacted with a respective data qubit such that one or more quantum errors that are likely to be present for the respective data qubit can be determined. In such instances, the manipulation and/or controlling signals generated by executing the TICs may cause an ancilla qubit to interact with a respective data qubit and/or cause a reading procedure to be performed such that the quantum state of the ancilla qubit or a data qubit is determined. In particular, the ancilla qubit or a data qubit to be read may be illuminated with a manipulation signal of a particular wavelength. If the ancilla qubit or the data qubit is in a first quantum state of the defined qubit space, the qubit will emit a signature signal. If the ancilla qubit or the data qubit is in a second quantum state of the defined qubit space, the qubit will not emit the signature signal.

The optics collection system 70 is configured to collect signals emitted by the ancilla qubits and/or data qubits of the quantum processor 115 to determine when the qubits do or do not emit the signature signal. For example, the optics collection system 70 performs optical signal collection 310. The A/D converters 225 and/or another element of the quantum system controller 30 converts the optical signals detected by the optics collection system 70 into digital signal values and stores the digital signal values to the system buffer 212. For example, control system buffering 320 may be performed to store the digital signal values corresponding to the reading of physical and/or ancilla qubits of the quantum processor to the system buffer 212 in memory 210 for quick and efficient access of the digital signal values by the processing device 205.

The processing device 205 may then access the digital signal values from the system buffer 212 (e.g., load the digital signal values into the operational memory 210 of the processing device 205) and perform value processing 330. In various embodiments, the processing device 205 performs value processing 330 to process the digital signal values to determine and/or generate input data based thereon. In an example embodiment, the input data is stored to a system buffer 212 and/or an operational memory 210 of the processing device 205 to be used during control processing 340.

The process 300 continues with some procedures, operations, and/or the like of the process 300 occurring simultaneously. For example, the TIC sequencer 235 may perform TIC sequencing 360 while the processing device 205 is performing value processing 330, control processing 340, and/or command generation 350. Similarly, the driver controller elements 215 may be executing TICs in a time-indexed manner while the TIC sequencer is performing additional TIC sequencing 235. Additionally, optical signal collection 310 and/or system buffering 320 may be occurring while other portions of the process 300 are being performed. In particular, the TIC sequencer 235 being a separate and dedicated processing element from the processing device 205 enables the processing device 205 to quickly and efficiently perform signal value processing 330, control processing 340 and command generation 350 while the TIC sequencer 235 continues to manage the time-indexed execution of the TICs. This enables the quantum processor 115 to continue performing various processes, procedures, and/or operations without significant delay caused by the processing device 205 processing new input data. This further enables the quantum system controller 30 to enact active quantum error correction in real-time and/or near real-time, between different portions of a quantum circuit, and/or within the coherence time of a data qubit to be acted on.

Figure 4:
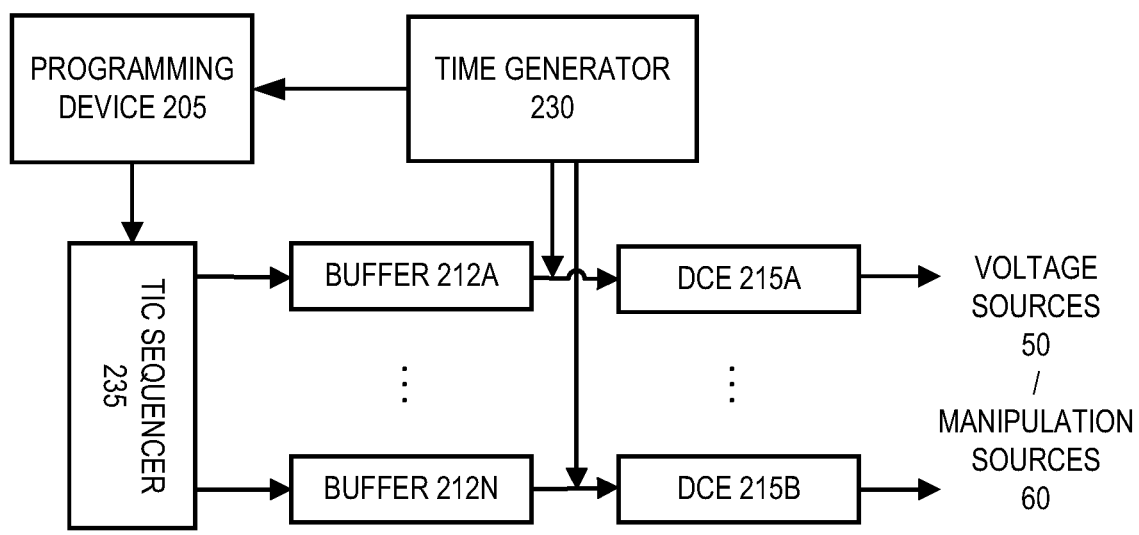
FIG. 4 is a schematic diagram illustrating how the evolution of one or more qubits is controlled by the quantum system controller, according to various embodiments.

FIG. 4 provides a schematic diagram illustrating how the processing device 205, TIC sequencer 235, and time generator 230 are used in concert to cause the time-indexed execution of TICs by the driver controller elements (DCEs) 215. For example, the timing generator 230 provides the clock, timing, and/or synchronizing signals such that each of components of the quantum system controller 30 are configured to maintain a distributed time and the DCEs 215 (e.g., DCE 215A-DCE 215N) are configured to execute TICs in a time-indexed and synchronized manner. For example, the processing device 205 generates commands (e.g., the first and/or second set of commands) and provides the commands to the TIC sequencer 235. The TIC sequencer time-indexes the commands to generate TICs and saves and/or stores the TICs to the buffer 212 corresponding to the DCE 215 that is to execute the respective TIC. For example, first TIC may be stored to a first buffer 212A corresponding to a first DCE 215A such that the first DCE 215A executes the first TIC. For example, an Nth TIC may be stored to an Nth buffer 212N corresponding to an Nth DCE 215N such that the Nth DCE 215N executes the Nth TIC. For example, the TIC sequencer 230 causes TICs to be executed by software operating on a respective DCE 215 to be made available to that software via a dedicated and/or corresponding firmware buffer. Execution of the TICs by the DCEs 215 causes the control of one or more manipulations sources 60 and/or voltage sources 50 by the respective DCEs 215 to cause one or more manipulation signals and/or controlling signals to be generated and provided to corresponding portions and/or elements of the quantum processor 115.

Figure 5:
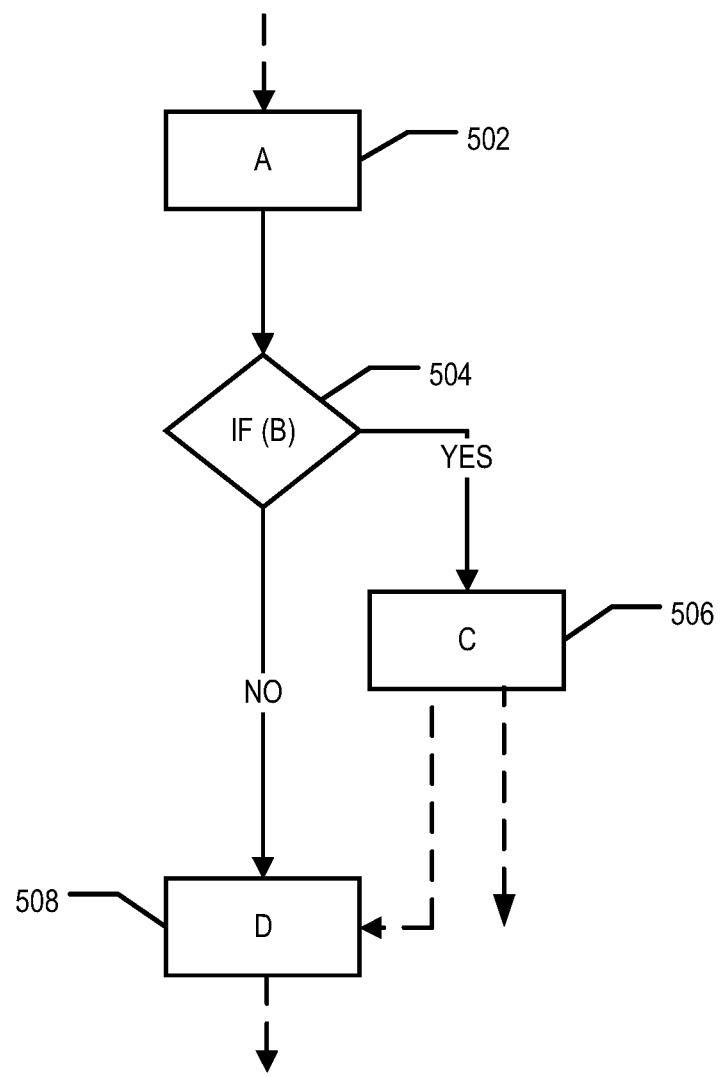
FIG. 5 is a flowchart illustrating the modification of a quantum circuit by a quantum system controller responsive to the processing of input data, according to various embodiments.

In various embodiments, the quantum system controller 30 may cause the quantum processor 115 to perform a first portion of a quantum circuit by generating and executing a first set of commands. Input data may then be processed to make one or more decisions and/or determinations regarding commands to be executed as part of a second set of commands configured to cause the quantum processor to perform a second portion of the quantum circuit. FIG. 5 provides a flowchart illustrating how the processing of input data is used by the quantum system controller 30 (e.g., the processing device 205 during the control processing 340) to determine which commands to include in a second set of commands.

Starting at step/operation 502, one or more commands A are executed by the quantum system controller 30 and/or driver controller elements 215 thereof. The execution of the one or more command A cause the quantum processor 115 to at least perform a first portion of the quantum circuit.

At step/operation 504, input data is processed and a determination is made based on the processing of the input data. In other words step/operation 504 is a conditional execution point where the next steps to be performed by the quantum computer are determined in real-time or near real-time with respect to the execution of the quantum circuit by the quantum computer. For example, the processing device 205 of the quantum system controller 30 processes the input data indicating a quantum state of one or more data qubits as a result the performance of the first portion of the quantum circuit, one or more quantum errors that are likely present with one or more data qubits (e.g., as a result the performance of the first portion of the quantum circuit), and/or the like. The determination is made as a function of the input data and/or the processing thereof. For example, a conditional B which takes the input data as input thereto and/or as a variable thereof is evaluated to determine a conditional result. When the conditional B evaluates to yes or true, the process continues to step/operation 506.

At step/operation 506, the processing device 205 determines and generates a sequence C of commands. In an example embodiment, the sequence C of commands includes software-based and/or active quantum error correction. For example, the sequence C of commands may include one or more commands configured to cause a data qubit to be acted on (for the Bloch sphere representation of the data qubit to be rotated, for example) via application of a manipulation signal, for example, to the data qubit. For example, the sequence C of commands may include the performance of one or more operations of the second portion of the quantum circuit. The sequence C of commands may be provided to the TIC sequencer 235 for generation of TICs and/or for buffering for execution by the respective driver controller elements 215. The process may then continue to step/operation 508 or may follow a different path than if the conditional B had evaluated to no or false. For example, the quantum circuit may branch after step/operation 504 based on the evaluation of the conditional B based on the input data.

At step/operation 508, the processing device 205 determines and generates a sequence D of commands. In an example embodiment, the sequence D of commands comprises one or more commands configured to cause performance of a second portion of the quantum circuit by the quantum computer 110. For example, the sequence D of commands may be provided to the TIC sequencer 235 for generation of TICs and/or for buffering for execution by the respective driver controller elements 215. In various embodiments, execution of the sequence D of commands or the sequence C of commands and the sequence D of commands by the quantum system controller 30 (e.g., by the respective driver controller elements 215) causes a second portion of the quantum circuit to be performed.

Figure 6:
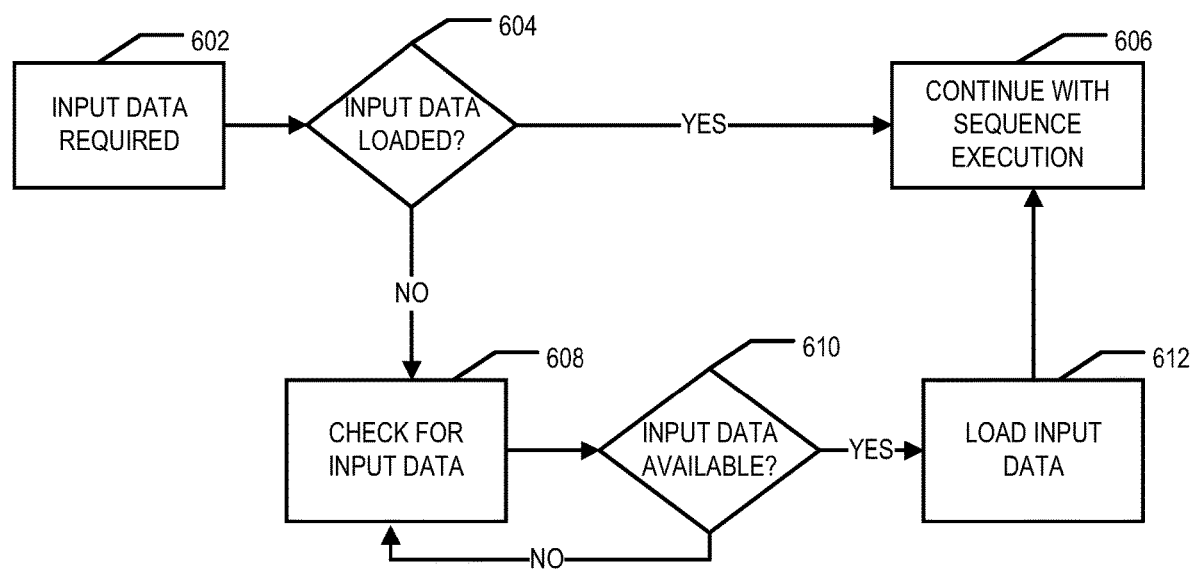
FIG. 6 is flowchart illustrating various processes, operations, and/or procedures performed by a processing device of a quantum system controller, according to various embodiments.

FIG. 6 provides a flowchart illustrating processes, procedures, operations, and/or the like that are performed when the processing device 205 determines that input data is needed to perform further control processing 340 and/or command generation 350. For example, when it is determined that the conditional B is to be evaluated based on the input data at step/operation 504, the processing device 205 may perform processes, procedures, operations, and/or the like similar to that shown in FIG. 6 to access the input data such that the conditional B can be evaluated based thereon. In another example, during execution of the first portion of the quantum circuit, software operating on the quantum system controller 30 (e.g., the processing device 205) tracks commands/TICs that are issued that will result in digital signal values and/or input data being generated (e.g., commands/TICs corresponding to reading procedures). Once that input data or digital signal value(s) are required to be consumed, for example, by the control processing 340 software (e.g., possibly via the value processing 330 software), the processes, procedures, operations, and/or the like illustrated by FIG. 6 may be performed.

For example, the performance of a second portion of a quantum circuit may be depend on a value of one or more qubits based on the performance of a first portion of the quantum circuit. In another example, the processing device 205 may determine that a gate or other physical and/or quantum manipulation of one or more data qubits is to be performed that potentially requires an active quantum error correction be performed to account for one or more quantum errors that are likely present for the one or more data qubits. For example, in various embodiments, the active quantum error correction includes adjusting and/or modifying a gate or other physical and/or quantum manipulation of one or more data qubits to be performed and/or that the one or more data qubits to have a correction enacted thereon prior to the performance of the gate and/or physical and/or quantum manipulation. For example, the correction may include a rotation of the data qubit in the block sphere representation thereof.

Starting at step/operation 602, it is determined that input data is required. For example, the processing device 205 determines that to continue control processing 340 and/or command generation 350, input data needs to be processed so that one or more decisions and/or determinations of the control processing 340 and/or command generation 350 can be performed. At step/operation 604, the processing device 205 determines whether the input data is loaded. For example, the processing device 205 determines whether the input has been loaded into the operational memory 210 used for performing the control processing 340 and/or command generation 350, respectively.

When it is determined that the input data is loaded, the process continues to step/operation 606. At step/operation 606, the input data is processed and/or provided as input to the control processing 340 and/or command generation 350 processes such that the sequence can continue to be executed. When it is determined that the input data is not loaded, the process continues to step/operation 608. At step/operation 608, the processing device 205 queries the system buffer 212 and/or checks an address of the system buffer where the input data is expected to be located. At step/operation 610 it is determined whether the input data is present in the system buffer 212. For example, the processing device 205 determines whether new or updated input data (e.g., based on a timestamp associated with the input data and a time when the input data was loaded into operational memory, for example) is available in the system buffer 212.

When it is determined at step/operation 610 that input data is available, the process continues to step/operation 612. At step/operation 612, the processing device 205 loads the input data into the operational memory from the system buffer. The processing device 205 then performs step/operation 606 to process and/or provide the input data as input to the control processing 340 and/or command generation 350 processes such that the sequence can continue to be executed.

When, at step/operation 610, it is determined that the input data is not available, the process returns to step/operation 608 to continue to check whether the input data is available until the input data becomes available so that the process can continue forward. Because the control software operating on and/or being executed by the processing device 205 is not responsible for the real-time nature of the system (e.g., ensuring that commands are executed at the appropriate times), the control software operating on and/or being executed by the processing device 205 is able to alternate between command generation and checking for the arrival of input data.

Figure 7:
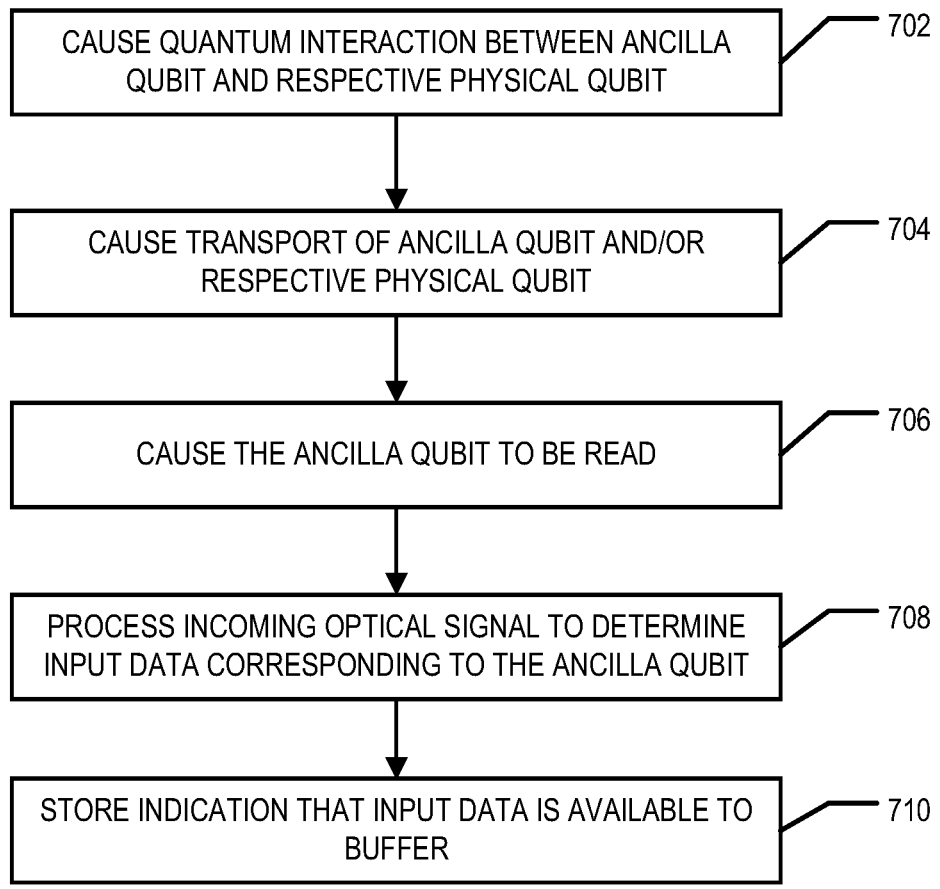
FIG. 7 is a flowchart illustrating various process, operations, and/or procedures performed by a quantum system controller, according to various embodiments.

FIG. 7 provides a flowchart illustrating operations, procedures, processes, and/or the like performed by a quantum system controller 30 to cause the generation of input data that may be used to determine quantum errors that are likely to be present for a data qubit. For example, the processing device 205 performs control processing 340 and command generation 350 to generate commands that, when executed in the time-indexed manner by the appropriate driver controller elements 215, cause the quantum computer 100 to perform a first portion of a quantum circuit using one or more data qubits (possibly organized into one or more logical qubits) of the quantum processor 115. In various embodiments, the commands may include commands regarding the generation of control signals configured to cause the transport of at least one qubit from a first position to a second position and/or the reordering of one or more qubits, the generation of one or more manipulation signals configured to cause the performance of one or more single or multiple (e.g., two) qubit gates, qubit initializations, reading procedures, and/or the like.

The processing device 205 may then determine that to generate a second set of commands configured to be executed by the quantum system controller 30 to cause a second portion of the quantum circuit to be performed (e.g., after the first portion of the quantum circuit), information regarding an outcome of one or more operations performed during the first portion of the quantum circuit is required. For example, the second portion of the quantum circuit may include the performance of a gate that, when not corrected for one or more possible quantum errors, may cause an inaccurate result to be obtained (e.g., cause quantum errors that are difficult and/or complicated to determine, account for, and/or correct to be introduced). Thus, information regarding quantum errors that are likely present for one or more data qubits is determined by generating and processing input data corresponding to the one or more data qubits. FIG. 7 illustrates an example embodiment of how the input data corresponding to a data qubit is generated.

Starting at step/operation 702, the quantum system controller 30 causes an ancilla qubit to interact with the data qubit. For example, the processing device 205 generates commands that causes the initiation of the ancilla qubit (e.g., causing the ancilla qubit to be in a known initial quantum state), the transportation of the ancilla qubit and/or the data qubit into the required proximity, an interaction to be performed such that information regarding the quantum state of the data qubit to be encoded onto the ancilla qubit while not changing the quantum state of the data qubit (or by only changing the quantum state of the data qubit in a known manner that can be accounted for and/or corrected), and/or the like. The TIC sequencer 235 performs a TIC sequencing 330 to generate TICs from the commands generated by the processing device 205 and store the TICs to the appropriate buffers. The driver controller elements 215 then each execute the TICs stored to the corresponding buffer 212 in a time-indexed manner, (e.g., based on clock, timing, and/or synchronizing signals generated by the time generator 230) to cause the initiation of the ancilla qubit (e.g., causing the ancilla qubit to be in a known initial quantum state), the transportation of the ancilla qubit and/or the data qubit into the required proximity, an interaction to be performed such that information regarding the quantum state of the data qubit to be encoded onto the ancilla qubit while not changing the quantum state of the data qubit (or by only changing the quantum state of the data qubit in a known manner that can be accounted for and/or corrected), and/or the like to be performed.

At step/operation 704, the transportation of the ancilla qubit and/or the data qubit is performed to separate the ancilla qubit and the data qubit. For example, the processing device 205 generates commands that cause the transportation of the ancilla qubit and/or the data qubit to separated positions, and/or the like. The TIC sequencer 235 performs a TIC sequencing 330 to generate TICs from the commands generated by the processing device 205 and store the TICs to the appropriate buffers. The driver controller elements 215 then each execute the TICs stored to the corresponding buffer 212 in a time-indexed manner, (e.g., based on clock, timing, and/or synchronizing signals generated by the time generator 230) to cause transportation of the ancilla qubit and/or the data qubit to separated positions, and/or the like to be performed.

At step/operation 706, the ancilla qubit is read. For example, processing device 205 generates commands that cause a reading procedure to be performed on the ancilla qubit. In various embodiments, the reading procedure comprises a manipulation signal of a particular wavelength being incident on the ancilla qubit, a shelving procedure to be performed, the monitoring of signals generated by one or more photodetectors of the optics collection system 70, and/or the like. The TIC sequencer 235 performs a TIC sequencing 330 to generate TICs from the commands generated by the processing device 205 and store the TICs to the appropriate buffers. The driver controller elements 215 then each execute the TICs stored to the corresponding buffer 212 in a time-indexed manner, (e.g., based on clock, timing, and/or synchronizing signals generated by the time generator 230) to cause the reading procedure to be performed on the ancilla qubit.

At step/operation 708, an incoming signal (e.g., captured and/or detected by the optics collection system 70 responsive to the performance of the reading procedure on the ancilla qubit) is processed to determine input data corresponding to the ancilla qubit. For example, one or more photodetectors of the optics collection system 70 collect and/or detect optical signals and generate electrical signals based thereon. The optics collection system 70 then passes the electrical signals that encode the collected and/or detected optical signals to one or more A/D converters 225 of the quantum system controller 30. The A/D converters 225 convert the analog electrical signals into digital electrical signals that encode the collected and/or detected optical signals. The resulting digital signal values are stored to the system buffer 212 and/or provided for value processing 330. In an example embodiment, the processing device 205 accesses the digital signal values from the system buffer and/or receives the digital signal values and performs value processing 330 to generate input data based on the digital signal values. In an example embodiment, the value processing 330 comprises processing the digital signal values to determine a quantum state of the ancilla qubit and/or one or more quantum errors that are likely present with the corresponding data qubit with which the ancilla qubit was interacted with at step/operation 702. The input data may then be stored to the system buffer 212, loaded to operational memory 210 used by the processing device 205 to perform control processing 340, and/or the like.

At step/operation 710, an indication that the input data is available and where the input data is stored is stored to the system buffer 212. For example, the processing device 205 may store an indication that the input data is available to the system buffer 212 such that at step/operation 610 the processing device 205 can easily and quickly determine whether input data is available. In various embodiments, the indication includes an address or location where the input data is stored such that the processing device 205 can easily and quickly load the input data at step/operation 612.

In various embodiments, whenever input data and/or digital signal values are available, that status is flagged in the CPU registers for the processing device 205 that have the lowest possible latency for software access. During normal operation of the control processing 340 and/or command generation 350, that CPU register is periodically checked to see if results are pending (e.g., a flag or other indicator indicating the input data and/or digital signal values are available). If there are, the input data and/or digital signal values are moved into program memory (e.g., operational memory) where it is immediately available once the input data and/or digital signal values are needed as specified in the control sequence (e.g., as determined by the control processing 340, for example). When the input data and/or digital signal values are moved into the program memory (e.g., operational memory) the flag or other indicator indicating the availability of new input data and/or digital signal values is reset.

As should be understood, quantum computers come in a variety of formats. For example, the illustrated quantum computer 100 shown in FIG. 1 uses atomic objects confined within an atomic object confinement apparatus 120 as physical and ancilla qubits. In various embodiments, the quantum computer uses Josephine junctions, photons, electron spin, and/or another two-state quantum system (or well-defined multiple state quantum system) as qubits. Depending on the types of qubits used and various other factors, a variety of quantum error correction techniques may be selected for use.

As described above, the separation of the processing device 205 configured to perform value processing 330, control processing 340, and command generation 350 and the TIC sequencer 235 configured to perform TIC sequencing, the processing device 205 is able to quickly and efficiently process the input data and continue with control processing and command generation while the quantum system controller 30 continues to execute TICs. This enables dynamic decision making by the quantum system controller 30 based on the input data. The dynamic decision making enables software-based and active quantum error correction to be performed in real-time or near real-time with the introduction of the quantum errors into the quantum calculations and/or the logical and/or data qubits. In particular, various embodiments enable quantum error correction to be performed (e.g., software-based and/or active quantum error correction) within the coherence time of a data qubit. Additionally, the storing of the input data, digital signal values that may be used to generate the input data, and/or an indication of the availability of input data and/or digital signal values and the location where the input data and/or digital signal values are stored directly to the system buffer 212 enables faster and more efficient loading of the input data and/or digital signal values for processing.

Various embodiments therefore provide a quantum system controller and/or methods for operation thereof to enable the use of various quantum error correction techniques. In general, a quantum error-correcting code (QECC) is a quantum algorithm that protects quantum information by encoding qubits into many additional qubits to provide redundancy to detect and correct errors. Qubits encoded into a QECC are known as logical qubits, and the gates that act on these logical qubits are known as logical gates. As described above, a logical qubit comprises a plurality of data qubits. Some examples of performing quantum error correction by a quantum system controller 30 will now be described in more detail based on the quantum computer 100 illustrated in FIG. 1 and an example QECC known as the Pauli stabilizer codes.

In various embodiments, the process of protecting quantum information encoded in a quantum system employing a QECC includes repeated rounds of syndrome extraction. During these rounds, multiple collections of data qubits storing data (known as data qubits) are jointly measured. The measurement results (e.g., input data) from these measurements are known as syndromes. After an appropriate number of rounds of syndrome extraction, these syndromes are supplied to an algorithm known as a decoding algorithm. The decoding algorithm uses syndrome information to determine corrections to the QECC to attempt to mitigate quantum errors that have accumulated in the quantum computation (e.g., quantum errors that have been introduced to various logical and/or data qubits) due to noise, for example (e.g., noise in manipulation and/or controlling signals, and/or the like).

In various embodiments, to avoid inadvertently inducing additional noise to the one or more data qubits, corrections determined by decoding algorithms are stored and tracked in software and not applied physically, when possible. For example, when possible, the corrections used are software-based corrections with active quantum error corrections being applied only under particular conditions and/or situations. For the example Pauli stabilizer codes (e.g., including surface and color codes) these software-based and/or software-tracked corrections are known as Pauli frames since the corrections for these codes are a set of Pauli operators. In various embodiments, each data qubit corresponds to a Pauli frame. For example, each data qubit register stored and/or maintained by the quantum system controller 30 comprises a Pauli frame, in an example embodiment. As new corrections are determined for a data qubit, the Pauli frame corresponding to the data qubit is updated with the new corrections evolving the Pauli frame after each execution of a decoding algorithm.

As noted above, in order to reduce the introduction of additional noise to the data qubits, active quantum error correction may only be performed under particular conditions and/or in particular situations. For example, certain quantum gates require that active quantum error corrections be applied before enacting the gate operations or to adapt, adjust, and/or modify the gate operations (such as by incorporating the correction into the gate operation). For Pauli stabilizer codes, such gates that require active quantum error corrections to be applied are known as non-Clifford gates, while other gates, known as Clifford gates, do not. It is noted however, that in general, the Pauli frame corresponding to a data qubit will need to be rotated in software according to which Clifford gate is applied. Therefore, in an example embodiment, the quantum system controller 30 takes software-tracked Pauli frames and either applies the Pauli frames physically before the logical non-Clifford gates (see FIG. 8A) or adapts the choice of logical gates based on the corrections (see FIG. 8B). After each physical application of the software Pauli frame due to a non-Clifford gate, Pauli frame corrections continue to be tracked and updated in software as appropriate.

FIG. 8A and FIG. 8B illustrate two possible techniques for performing active quantum error correction in the Pauli stabilizer codes framework. FIG. 8A illustrates where, for a single logical qubit 810, a syndrome extraction 815 is repeatedly performed. The results of the syndrome extraction 815 are processed using a decoding algorithm 820 (e.g., executed by processing device 205, possibly as part of the value processing 330 and/or control processing 340). The results of the syndrome extraction 815 and/or the results of processing the results of the syndrome extraction using a decoding algorithm 820 are used to update the software-tracked Pauli frame 805 for the logical qubit to perform software-based quantum error correction. Thus, when a Clifford gate 830 is performed on the logical qubit 810 (e.g., the gate is performed at approximately the same time on all of the data qubits of the logical qubit 810), no active quantum error correction is performed, in the illustrated embodiment. However, prior to performance of the non-Clifford gate 845, a correction 840 for the logical qubit 810 is determined (e.g., as part of the control processing 340 and the corresponding commands are then generated as part of the command generation 350) based on the software-tracked Pauli frame 805 for the logical qubit and applied to the logical qubit (e.g., each of the data qubits of the logical qubit 810 at approximately the same time). The non-Clifford gate 845 is then applied to the logical qubit 810 after the correction 840 has been applied. The repeated performance of the syndrome extraction 815 continues after performance of the non-Clifford gate 845, with the software-tracked Pauli frame 805 being updated accordingly. This scheme extends in an analogous manner to multiple logical qubits and gates such as is indicated in FIG. 9.

FIG. 8B illustrates another technique for performing active quantum error correction in accordance with the Pauli stabilizer code framework. Starting on the left of FIG. 8B, a syndrome extraction 815 is repeatedly performed for logical qubit 810. The results of the syndrome extraction 815 are processed using a decoding algorithm 820 (e.g., executed by processing device 205, possibly as part of the value processing 330 and/or control processing 340). The results of the syndrome extraction 815 and/or the results of processing the results of the syndrome extraction using a decoding algorithm 820 are used to update the software-tracked Pauli frame 805 for the logical qubit to perform software-based quantum error correction. Thus, when a Clifford gate 830 is performed on the logical qubit 810 (e.g., the gate is performed at approximately the same time on all of the data qubits of the logical qubit 810), no active quantum error correction is performed, in the illustrated embodiment. However, prior to performance of a non-Clifford gate, adjustments and/or modifications of the non-Clifford gate are determined. In the illustrated embodiment, the non-Clifford gate is performed as a first non-Clifford gate 845A and a second non-Clifford gate 845B that are applied to the logical qubit 810 in succession. In particular, the corrections are applied to the logical qubit 810 by adaptively choosing the appropriate non-Clifford gate(s) 845 (e.g., by the control processing 340 based at least in part on the software-tracked Pauli frame 805 for the logical qubit 810) and then applying the adaptively chosen non-Clifford gates 845A, 845B to the logical qubit 810 (e.g., based on corresponding commands generated as part of the command generation 350 and queued for execution as part of the TIC sequencing 360). Therefore, the non-Clifford gates 845A, 845B both apply the correction determined based on the software-tracked Pauli frame 805 and apply the non-Clifford gate corresponding to the execution of the quantum circuit. The repeated performance of the syndrome extraction 815 continues after performance of the non-Clifford gate 845, with the software-tracked Pauli frame 805 being updated accordingly. As should be understood, the performance of a quantum circuit may use one or both of the active quantum error correction techniques illustrated in FIGS. 8A and 8B, as appropriate for the quantum circuit and/or the quantum system.

FIG. 9 illustrates two logical qubits 910A, 910B encoded into two surface codes of the Pauli stabilizer codes framework. In particular, a first software-tracked Pauli frame 905A tracks the quantum errors and/or quantum error corrections for the first logical qubit 910A and a second software-tracked Pauli frame 905B tracks the quantum errors and/or quantum error corrections for the second logical qubit 910B. The software-tracked Pauli frames 905A, 905B are evolved and/or updated (via syndrome extraction and use of a decoding algorithm to processes the results of the syndrome extraction as indicated by the dotted lines pointing from the respective logical qubit wire 911A, 911B to the corresponding software-tracked Pauli frame wire 906A, 906B) as logical gates are applied to the logical qubits 910A, 910B. For example, the first software-tracked Pauli frame 905A is updated to indicate the performance of Hadamard gate 920 on the first logical qubit 910A. The first and second software-tracked Pauli frames 905A, 905B are then updated to indicate the occurrence of the control not gate with the first logical qubit 910A acting as the control qubit and the second logical qubit 910B acting as the target qubit. As the Hadamard gate and the control not gate are both Clifford gates, no active quantum error correction is applied immediately prior to performing these two gates. A correction 940A is determined based on the first software-tracked Pauli frame 905A and applied to the first logical qubit 910A prior to the performance of a first non-Clifford gate 945A to the first logical qubit 910A. A second correction 940B is determined based on the first software-tracked Pauli frame 905A and applied to the first logical qubit 910A while a third correction 940C is determined based on the second software-tracked Pauli frame 910B and applied to the second logical qubit 910B. The second non-Clifford gate 945B is then performed on both the first and second logical qubits 910A, 910B. The Pauli frame 905A, 905B of each logical qubit 910A, 910B ($pf_0$ and $pf_1$) is updated at various points in the quantum circuit as new corrections 940 are determined after rounds of syndrome extraction and decoding occur. The Pauli frames 905A, 905B are also updated according to the how the gates (Clifford and non-Clifford gates) would act on the operators represented by the respective Pauli frame. In this example, a correction is applied before the non-Clifford gates and the corresponding Pauli frame(s) are updated and continue to be tracked in software. In another example embodiment, and/or at a different point in the partially illustrated quantum circuit, the active quantum error correction may be performed by the adaptation, selection, modification, and/or the like of the non-Clifford gate(s) applied to the logical qubit(s).

In various embodiments, syndrome extraction is composed of a series of quantum gates which are encoded into parallel operations across data qubits and ancilla qubits. In an example embodiment, syndrome extraction includes steps/operations 702-706 shown in FIG. 7. In various embodiments, a round of syndrome extraction requires that an ancilla qubit have quantum interactions with two or more data qubits of the same logical qubit or of different logical qubits. This requires a transport pattern be compiled which allows for each ancilla-data qubit interaction while minimizing the overall number of rounds of gating and time spent moving physical qubits. Measurements generated by performing a reading procedure on the ancilla qubits store and/or encapsulate the results of the syndrome extraction.

To enable the syndrome extract, in various embodiments, a user (e.g., operating a (classical) computing entity 10) is able to express a general quantum circuit that will be translated and optimized (e.g., by the quantum system controller 30) for performance by the quantum processor 110. In various embodiments, a user (e.g., operating a (classical) computing entity 10) can add any necessary or desired constraints to operations through the addition of barriers of the quantum circuit and the quantum circuit and the associated barriers are translated and optimized by the quantum system controller 30 for performance of the quantum circuit by the quantum processor 115. In various embodiments, the quantum circuit is encoded, optimized, and parallelized by a compilation process (e.g., performed by the quantum system controller 30) to a set of parallel operations on the quantum system. In an example embodiment, the compilation process is performed in real-time and/or near real-time with the execution of at least a portion of the quantum circuit by the quantum processor 115.

In various embodiments, once a syndrome is extracted it must be decoded to determine the most likely errors that occurred in the quantum circuit and/or that have been introduced to the logical and/or data qubits (see step/operation 708 shown in FIG. 7). These calculations are purely classical evaluations of ancilla measurements with the goal being an update to the software-tracked Pauli-frame for each logical qubit which tracks the most likely correction that needs to be applied to that logical qubit. Multiple rounds of extracted syndrome measurements may be used in combination to more accurately determine the most likely error(s) that have occurred.

In various embodiments, the real-time arithmetic for decoding the extracted syndrome measurements are encoded into the same description as the quantum circuit that is handled directly by the main program operating on the quantum system controller 30. In various embodiments, for more complex computations, the quantum system controller 30 may perform external call-outs to classical computers working in tandem and in real-time to use sandboxed classical code executed in real-time to perform the computations and return results to the quantum system controller 30 in real-time or near real-time.

In various embodiments, when a quantum gate to be enacted on a logical qubit that has a non-identity Pauli-frame is encountered, a quantum error correction is performed. In various embodiments, the quantum error correction may be a software-based quantum error correction or an active quantum error correction, such as applying the correction to the logical and/or data qubits of the logical qubit and/or updating and/or modifying the quantum gate. In various embodiments, to apply the active quantum error correction, the Pauli-frame of the logical qubit dictates one or more quantum gates to be applied to a set of the data qubits that make up the logical qubit. For example, an active quantum error correction may be performed in situations where a non-Clifford gate will be applied which some, or all, of the Pauli-frame cannot pass-through and/or be updated to account for.

FIG. 10A illustrates how the application of a correction determined based on the Pauli-frame of a logical qubit is applied to the logical qubit. In particular, FIG. 10A shows that a real-time decision is made that fundamentally affects which logical gates should be applied to the logical qubit as the correction, and how the Pauli-frame should be updated (in this case reset back to the Identity Pauli-frame state). The left column of FIG. 10A describes each step, the middle column illustrates the high-level system primitives that are engaged at each step and the right column lists the quantum system controller 30 primitive (software) element types that are used in that step.

FIG. 10B illustrates the adaptation, adjustment, and/or modification of a logical gate based on a Pauli frame of the logical qubit on which the logical gate is to be enacted. For example, in various embodiments, a logical gate can take the Pauli frame as an input parameter and the logical gate may be dynamically (e.g., in real-time or near real-time) updated, adapted, and/or modified and then applied so that the correct gate is applied in the frame of reference of the data qubits. Any necessary updates to the Pauli-frame are made as well.

For example, FIG. 10B shows how a logical T-gate (e.g., an example non-Clifford gate) is adjusted, adapted, and/or modified as it is applied to a logical qubit. For example, FIG. 10B shows that a real-time or near real-time decision is made that fundamentally affects which logical gates should be applied (e.g., the T-gate or the $T^\dagger$-gate) to the logical qubit, and how the Pauli-frame should be updated uniquely based on the current Pauli-frame for the logical qubit. The left column of FIG. 10B describes each step, the middle column illustrates the high-level system primitives that are engaged at each step, and the right column lists the quantum system controller 30 primitive (software) element types that are used in that step.

For some gates (e.g., Clifford gates), it is possible to perform software-based correction, for example, by simply updating the Pauli-frame or internally tracked qubit state of the logical qubit and/or one or more data qubits of the logical qubit instead of applying any gates to the physical qubit. The advantage of this is that tracking this update in software does not accumulate error through the inaccurate application of a physical gate or additional transport of the data qubits. The software-based quantum correction maintains the full fidelity of the quantum state of the logical qubit (and/or its constituent data qubits) to the precision of the software tracking employed.

FIG. 10C shows how the application of a logical operation is applied to a logical qubit using software-based quantum error correction without requiring any physical operation in the quantum processor 115. FIG. 10C shows that a real-time or near real-time decision is made that affects which Pauli frame update is applied. However, as shown in FIG. 10C, no quantum gate needs to be applied to perform the quantum error correction for the software-based quantum error correction process. The left column of FIG. 10C describes each step, the middle column illustrates the high-level system primitives that are engaged at each step, and the right column lists the quantum system controller 30 primitive (software) element types that are used in that step.

FIG. 11 provides a flowchart illustrating processes, procedures, operations, and/or the like by a processing device 205 of a quantum system controller 30 to perform real-time process control, including quantum error correction. Starting at step/operation 1102, a first set of commands are generated. For example, the processing device 205 executes and/or operates executable code and/or instructions configured to cause the processing device 205 to perform command generation 350 based at least in part on a quantum circuit to be performed. In an example embodiment, the quantum circuit is provided by a computing entity 10 received by the quantum system controller 30 (e.g., via communication interface 220). In various embodiments, the commands include commands to be executed by driver controller elements 215 that are configured to control and/or operate voltage sources 50, manipulation sources 60, components of the optics collection system 70, and/or the like. For example, the commands may be configured to cause the transport of one or more physical qubits within the quantum processor 115, the performance of one or more quantum gates on physical qubits of the quantum processor 115, the resetting of photon counts of photodetectors of the optics collection system 70, and/or the like.

At step/operation 1104, the processing device 205 provides the first set of commands to the TIC sequencer 235. In an example embodiment, various commands of the first set of commands are configured to be executed simultaneously.

For example, a group of commands may be configured to cause a plurality of voltage sources generate controlling signals that are provided to electrodes of an atomic object confinement apparatus 120 of the quantum processor 115 that cause a physical qubit to be transported within the atomic object confinement apparatus in a prescribed manner. In another example, a group of commands may be configured to cause one or more manipulation sources 60 to generate one or more manipulation signals that are provided to the quantum processor 115 such that the manipulation signals are incident on one or more physical qubits to enact one or more gates.

In various embodiments, the processing device 205 provides the commands of the first set of commands to the TIC sequencer 235 as each command is generated. In various embodiments, the processing device 205 provides groups of commands to the TIC sequencer 235. In an example embodiment, the processing device 205 generates all of the commands of the first set of commands and provides the entire first set of commands to the TIC sequencer 235.

At step/operation 1106, the processing device 205 (e.g., executable instructions and/or code corresponding to the control processing 340 executing on the processing device 205) determines that input data is required. For example, the processing device 205 may determine that to continue generating commands to cause the performance of the quantum circuit, a conditional needs to be evaluated. For example, as shown in FIG. 5, the second set of commands to be generated may depend on the evaluation of a conditional. For example, based on the evaluation of conditional B, the processing device 205 may determine whether the second set of commands should include just sequence D or both sequence C and sequence D. When the processing device 205 determines that a conditional is to be evaluated and/or the processing of input data is needed to determine a second set of commands, the processing device 205 access the input data. For example, the processing device 205 may follow a method similar to that shown in FIG. 6 to access and/or load the input data.

At step/operation 1108, the processing device 205 (e.g., executable instructions and/or code corresponding to the value processing 330 and/or control processing 340 executing on the processing device 205) processes and/or analyzes the input data. For example, the processing device 205 processes and/or analyzes the input data to evaluate a conditional and/or the like. For example, the input data may be used to determine a quantum state of one or more data qubits and/or logical qubits. For example, the input data may be used quantum errors that are likely to have been introduced into the quantum calculation, logical qubit(s), and/or data qubit(s).

At step/operation 1110, the processing device 205 (e.g., executable instructions and/or code corresponding to the control processing 340 executing on the processing device 205) determines the commands to be generated as the second set of commands and the processing device 205 (e.g., executable instructions and/or code corresponding to the command generation 350 executing on the processing device 205) generates the second set of commands. In various embodiments, the commands include commands to be executed by driver controller elements 215 that are configured to control and/or operate voltage sources 50, manipulation sources 60, components of the optics collection system 70, and/or the like. For example, the commands may be configured to cause the transport of one or more physical qubits within the quantum processor 115, the performance of one or more quantum gates on physical qubits of the quantum processor 115, the resetting of photon counts of photodetectors of the optics collection system 70, and/or the like. In various embodiments, execution of the second set of commands, for example, by the appropriate driver controller elements 215 causes quantum error correction to be performed (e.g., software-based error correction and/or active quantum error correction) and/or at least a second portion of the quantum circuit to be executed.

At step/operation 1112, the processing device 205 provides the second set of commands to the TIC sequencer 235. In various embodiments, the processing device 205 provides the commands of the second set of commands to the TIC sequencer 235 as each command is generated. In various embodiments, the processing device 205 provides groups of commands to the TIC sequencer 235. For example, in an example embodiment, various commands of the second set of commands are configured to be executed simultaneously. For example, a group of commands may be configured to cause a plurality of voltage sources generate controlling signals that are provided to electrodes of an atomic object confinement apparatus 120 of the quantum processor 115 that cause a physical qubit to be transported within the atomic object confinement apparatus in a prescribed manner. In another example, a group of commands may be configured to cause one or more manipulation sources 60 to generate one or more manipulation signals that are provided to the quantum processor 115 such that the manipulation signals are incident on one or more physical qubits to enact one or more gates. In an example embodiment, the processing device 205 generates all of the commands of the second set of commands and provides the entire second set of commands to the TIC sequencer 235.

Technical Advantages

Various embodiments provide a quantum system controller and corresponding methods for performing high reliability quantum calculations. To achieve such reliability, various embodiments employ quantum error correction (QEC) during computations (e.g., during performance of a quantum circuit) to suppress and/or reduce noise to required and/or minimal levels. In particular, the quantum system controller comprises is configured to determine quantum errors that are likely present with one or more data and/or logical qubits, determine corrections (e.g., software-based corrections and/or active quantum error corrections) to address the quantum errors, and to enact the quantum error correction in real-time and/or near real-time as the quantum circuit is being performed. For example, in an example embodiment, the quantum system controller is configured to perform a quantum error correction between the performance of two gates on a data or logical qubit. For example, the quantum system controller is configured to perform a quantum error correction in a time period that is less than the coherence time of a data qubit. In various scenarios the coherence time of a data qubit is less than twenty minutes, less than ten minutes, less than five minutes, or less than a minute. In various embodiments, a quantum error correction of various embodiments takes approximately 0.1 to 0.2 seconds to perform. For example, the latency of the quantum system controller are on the order of 10 to a few 100 microseconds. Thus, various embodiments provide technical solutions to the technical problem of how to enable a quantum system controller to perform quantum error correction (e.g., within a coherence time of a corresponding data qubit) such that the performance of the quantum computer is improved.

Various embodiments described herein provide a quantum system controller and/or corresponding methods that enable quantum error correction by translating and reordering conditional gates and classical logic from a quantum description to serialized, potentially conditional, operations to be performed by a quantum processor. The translation converts general quantum gates to the gates that are performable by the quantum processor and aligns the number of operations to the parallelism that is allowed on the quantum processor. The quantum system controller places (e.g., at physical locations within the quantum processor, for example) and orders both quantum and classical operations to maximize parallelism on the quantum processor, to minimize execution time and heating (e.g., introduction of thermal noise), all while ensuring any dependencies are preserved.

For example, the quantum system controller 30 comprises a processing device 205 that performs value processing 330, control processing, 340 and command generation 350 for the quantum computer. However, a separate processing element, the TIC sequencer 235, is responsible for the real-time or near real-time operation (e.g., parallel and/or simultaneous execution of commands using TICs) of the quantum system controller 30 and the quantum computer 110. Thus, the processing device 205 can pause the performance of command generation 350 to access and/or load input data, evaluate a conditional based on the input data, perform control processing based on the evaluation of the conditional based on the input data, and then return to command generation to generate commands to cause the quantum processor to perform active quantum error correction and/or to continue performing a quantum circuit. However, the processing device pausing the command generation does not slow down or pause the continued real-time or near real-time execution of TICs by the quantum system controller, as that process is managed by the TIC sequencer 235. Additionally, the use of flags in buffer memory and the automatic loading of digital signal values and/or input data into program and/or operational memory based on the flags stored in buffer memory decrease delays and/or lags introduced by the processing device accessing and/or loading the digital signal values and/or input data. Thus, various embodiments, improve the functioning of quantum system controllers and quantum computers by enabling higher reliability measurements through the use of real-time or near real-time quantum error correction and increased speed and operating efficiency of the quantum system controller.

Exemplary Computing Entity

FIG. 12 provides an illustrative schematic representative of an example computing entity 10 that can be used in conjunction with embodiments of the present disclosure. In various embodiments, a computing entity 10 is a classical (e.g., semiconductor-based) computer configured to allow a user to provide input to the quantum computer 110 (e.g., via a user interface of the computing entity 10) and receive, display, analyze, and/or the like output from the quantum computer 110.

As shown in FIG. 12, a computing entity 10 can include an antenna 1212, a transmitter 1204 (e.g., radio), a receiver 1206 (e.g., radio), and a processing element 1208 that provides signals to and receives signals from the transmitter 1204 and receiver 1206, respectively. The signals provided to and received from the transmitter 1204 and the receiver 1206, respectively, may include signaling information/data in accordance with an air interface standard of applicable wireless systems to communicate with various entities, such as a quantum system controller 30, other computing entities 10, and/or the like.

In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 1216 and/or speaker/speaker driver coupled to a processing element 1208 and a touch screen, keyboard, mouse, and/or microphone coupled to a processing element 1208). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 1218 (hard or soft), a touch display, voice/speech or motion interfaces, scanners, readers, or other input device. In embodiments including a keypad 1218, the keypad 1218 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 1222 and/or non-volatile storage or memory 1224, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

Conclusion

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   generating, by a processing device of a quantum system controller of a quantum computer, a first set of commands configured to cause a quantum processor of the quantum computer to perform a first portion of a quantum circuit using one or more logical qubits of the quantum processor, each logical qubit of the one or more logical qubits comprising one or more data qubits;
   causing, by the processing device, the first set of commands to be provided to a time-indexed command (TIC) sequencer of the quantum computer for time sequencing and time-indexed execution, wherein time-indexed execution of the first set of commands causes one or more elements of the quantum computer to perform the first portion of the quantum circuit using the one or more logical qubits;
   determining, by the processing device, that input data is required prior to generation of a second set of commands configured to cause the quantum processor to perform a second portion of the quantum circuit using the one or more logical qubits of the quantum processor, wherein generating the input data comprises reading one or more ancilla qubits of the quantum processor and the input data corresponds to quantum states of at least one of the one or more data qubits after performance of a respective action;
   responsive to determining that the input data is required prior to the generation of the second set of commands, accessing, by the processing device, the input data; and
   processing, by the processing device, the input data, generating the second set of commands based on a result of processing the input data, and causing the second set of commands to be provided to the TIC sequencer for time-indexed execution of the second set of commands within the coherence time of the one or more data qubits, the coherence time being with respect to the respective action.

2. The method of claim 1, wherein accessing the input data comprises:
   determining whether the input data has been loaded by a control processing application being executed by the processing device;
   responsive to determining that the input data has been loaded by the control processing application, beginning analyzing the input data;
   responsive to determining that the input data has not been loaded by the control processing application, determining whether the input data is present in a buffer memory of the controller; and
   when it is determined that the input data is present in the buffer memory, loading the input data to the control processing application.

3. The method of claim 1, wherein the coherence time of the one or more data qubits is a length of time a respective state of each of data qubit of the one or more data qubits is maintainable.

4. The method of claim 1, wherein the controller comprises a time generator configured to provide synchronizing signals configured to cause the synchronized execution of two or more time-indexed commands of the first set of commands at a respective time.

5. The method of claim 1, wherein the quantum processor is an atomic object confinement apparatus and the one or more data qubits and the one or more ancilla qubits are atomic objects confined by the atomic object confinement apparatus.

6. The method of claim 1, wherein prior to reading an ancilla qubit of the one or more ancilla qubits, a quantum interaction is caused between the ancilla qubit and a respective data qubit that does not affect a quantum state of the respective data qubit.

7. The method of claim 1, wherein reading an ancilla qubit of the one or more ancilla qubits comprises determining a quantum state of the ancilla qubit based on an optical signal corresponding to the ancilla qubit captured by one or more collection optics elements.

8. The method of claim 7, wherein the input data is stored to a buffer memory of the controller by an analog-to-digital converter that received an electrical signal generated based on the optical signal.

9. The method of claim 1, wherein the one or more data qubits of a first logical qubit are acted on with a same type of gate at approximately the same time.

10. The method of claim 1, wherein execution of at least one command of the first set of commands causes at least one of (a) a voltage source to provide a control signal to at least one electrode of the quantum processor or (b) a manipulation source to provide manipulation signal to at least one data qubit of the quantum processor.

11. A quantum system controller comprising:
    a processing device comprising at least one first processing element;

a time-indexed command (TIC) sequencer comprising at least one second processing element; and a plurality of driver controller elements, each driver controller element (a) configured to control the operation of a respective component of a quantum computer and (b) associated with a respective buffer and a respective processing element, wherein:

the processing device is configured to generate a first set of commands configured to cause a quantum processor of the quantum computer to perform a first portion of a quantum circuit using one or more logical qubits of the quantum processor, each logical qubit of the one or more logical qubits comprising one or more data qubits and cause the first set of commands to be provided to the TIC sequencer, the TIC sequencer is configured to cause the time-indexed execution of the first set of commands by generating a time ordered queue of TICs to be performed by a respective driver controller element of the plurality of driver controller elements in the associated respective buffer for time-indexed execution by the associated respective processing element, wherein the time-indexed execution of the first set of commands causes the quantum computer to perform the first portion of the quantum circuit using the one or more logical qubits;

the processing device is further configured to determine that input data is required prior to generation of a second set of commands, wherein the second set of commands is configured to cause the quantum processor to at least perform a second portion of the quantum circuit using the one or more logical qubits of the quantum processor, wherein generating the input data comprises reading one or more ancilla qubits of the quantum processor and the input data corresponds to quantum states of at least one of the one or more data qubits after performance of a respective action;

the processing device is further configured to, responsive to determining that the input data is required prior to the generation of the second set of commands, access the input data; and the processing device is further configured to process the input data, generate the second set of commands based on a result of processing the input data, and cause the second set of commands to be provided to the TIC sequencer for time-indexed execution of the second set of commands by respective driver controller elements within the coherence time of the one or more data qubits, the coherence time being with respect to the respective action.

12. The quantum system controller of claim 11, wherein the processing device is configured to access the input data by:

determining whether the input data has been loaded by a control processing application being executed by the processing device;

responsive to determining that the input data has been loaded by the control processing application, beginning analyzing the input data;

responsive to determining that the input data has not been loaded by the control processing application, determining whether the input data is present in a buffer memory of the controller; and when it is determined that the input data is present in the buffer memory, loading the input data to the control processing application.

13. The quantum system controller of claim 11, wherein the coherence time of the one or more data qubits is a length of time a respective state of each of data qubit of the one or more data qubits is maintainable.

14. The quantum system controller of claim 11, further comprising a time generator configured to provide synchronizing signals to the TIC sequencer and each of the plurality of driver controller elements, the synchronizing signals configured to cause the synchronized execution of two or more time-indexed commands of the first set of commands at a respective time.

15. The quantum system controller of claim 11, wherein the quantum processor is an atomic object confinement apparatus and the one or more data qubits and the one or more ancilla qubits are atomic objects confined by the atomic object confinement apparatus.

16. The quantum system controller of claim 11, wherein prior to reading an ancilla qubit of the one or more ancilla qubits, a quantum interaction is caused between the ancilla qubit and a respective data qubit that does not affect a quantum state of the respective data qubit.

17. The quantum system controller of claim 11, wherein reading an ancilla qubit of the one or more ancilla qubits comprises determining a quantum state of the ancilla qubit based on an optical signal corresponding to the ancilla qubit captured by one or more collection optics elements of an optics collection system in communication with the quantum system controller.

18. The quantum system controller of claim 17, wherein the input data is stored to a buffer memory of the controller by an analog-to-digital converter that received an electrical signal generated based on the optical signal.

19. The quantum system controller of claim 11, wherein the one or more data qubits of a first logical qubit are acted on with a same type of gate at approximately the same time.

20. The quantum system controller of claim 11, wherein execution of at least one command of the first set of commands causes at least one of (a) a voltage source to provide a control signal to at least one electrode of the quantum processor or (b) a manipulation source to provide a manipulation signal to at least one data qubit of the quantum processor.

* * * * *